United States Patent
Ikenishi

(10) Patent No.: US 8,728,962 B2
(45) Date of Patent: May 20, 2014

(54) OPTICAL GLASS, PREFORM FOR PRESS FORMING, OPTICAL ELEMENT, AND PROCESSES FOR PRODUCING THESE

(71) Applicant: Hoya Corporation, Tokyo (JP)

(72) Inventor: Miko Ikenishi, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/707,743

(22) Filed: Dec. 7, 2012

(65) Prior Publication Data

US 2014/0005025 A1    Jan. 2, 2014

Related U.S. Application Data

(62) Division of application No. 12/528,189, filed as application No. PCT/JP2008/053897 on Feb. 27, 2008, now Pat. No. 8,354,352.

(30) Foreign Application Priority Data

Mar. 6, 2007    (JP) .................................. 2007-055316

(51) Int. Cl.
  *C03C 3/23*    (2006.01)
  *C03C 3/247*    (2006.01)
  *C03C 3/16*    (2006.01)

(52) U.S. Cl.
  USPC .................................. 501/44; 501/43; 501/45

(58) Field of Classification Search
  USPC ........ 501/41, 43, 44, 45–48; 65/404, 454, 66, 65/68, 126, 127, 133
  See application file for complete search history.

(56) References Cited

U.S. PATENT DOCUMENTS

| | | | |
|---|---|---|---|
| 2,120,814 A | 10/1978 | Izumitani et al. |
| 4,225,459 A | 9/1980 | Faulstich et al. |
| 4,990,468 A | 2/1991 | Komiya |
| 2004/0087428 A1 | 5/2004 | Otsuka et al. |
| 2006/0223689 A1 | 10/2006 | Ikenishi et al. |
| 2007/0027017 A1 | 2/2007 | Hachitani |
| 2007/0060464 A1 | 3/2007 | Ikenishi et al. |

FOREIGN PATENT DOCUMENTS

| | | |
|---|---|---|
| JP | 53-132014 | 11/1978 |
| JP | 1-270537 | 10/1989 |
| JP | 2-124740 | 5/1990 |
| JP | 02-149445 | 6/1990 |

(Continued)

OTHER PUBLICATIONS

International Search Report for PCT/JP2008/053897, mailed Jun. 10, 2008.

*Primary Examiner* — Noah Wiese

(74) *Attorney, Agent, or Firm* — Nixon & Vanderhye P.C.

(57) ABSTRACT

Provided is a low-dispersion optical glass that is formed of a fluorophosphate glass in which the molar ratio of the content of $O^{2-}$ to the content of $P^{5+}$, $O^{2-}/P^{5+}$, is 3.5 or more and that has an Abbe's number $(v_d)$ of over 70 or has an $F^-$ content of 65 anionic % or more, and the optical glass enables the suppression of the volatilization of a glass component when an optical glass formed of a fluorophosphate glass is produced or when an obtained glass in a molten state is caused to flow out to shape it into a glass shaped material, so that the variation of properties such as a refractive index, etc., involved in the fluctuations of a glass composition and the variation of quality such as the occurrence of striae can be suppressed.

13 Claims, 1 Drawing Sheet

(56) References Cited

FOREIGN PATENT DOCUMENTS

| JP | 5-208842 | 8/1993 |
|----|----------|--------|
| JP | 6-157068 | 6/1994 |
| JP | 8-133780 | 5/1996 |
| JP | 9-202642 | 8/1997 |
| JP | 9-211505 | 8/1997 |
| JP | 10-139454 | 5/1998 |
| JP | 11-60267 | 3/1999 |
| JP | 11-060267 A * | 3/1999 ............ C03C 3/247 |
| JP | 2007-76958 | 3/2007 |
| WO | WO 03/037813 A1 | 5/2003 |

* cited by examiner

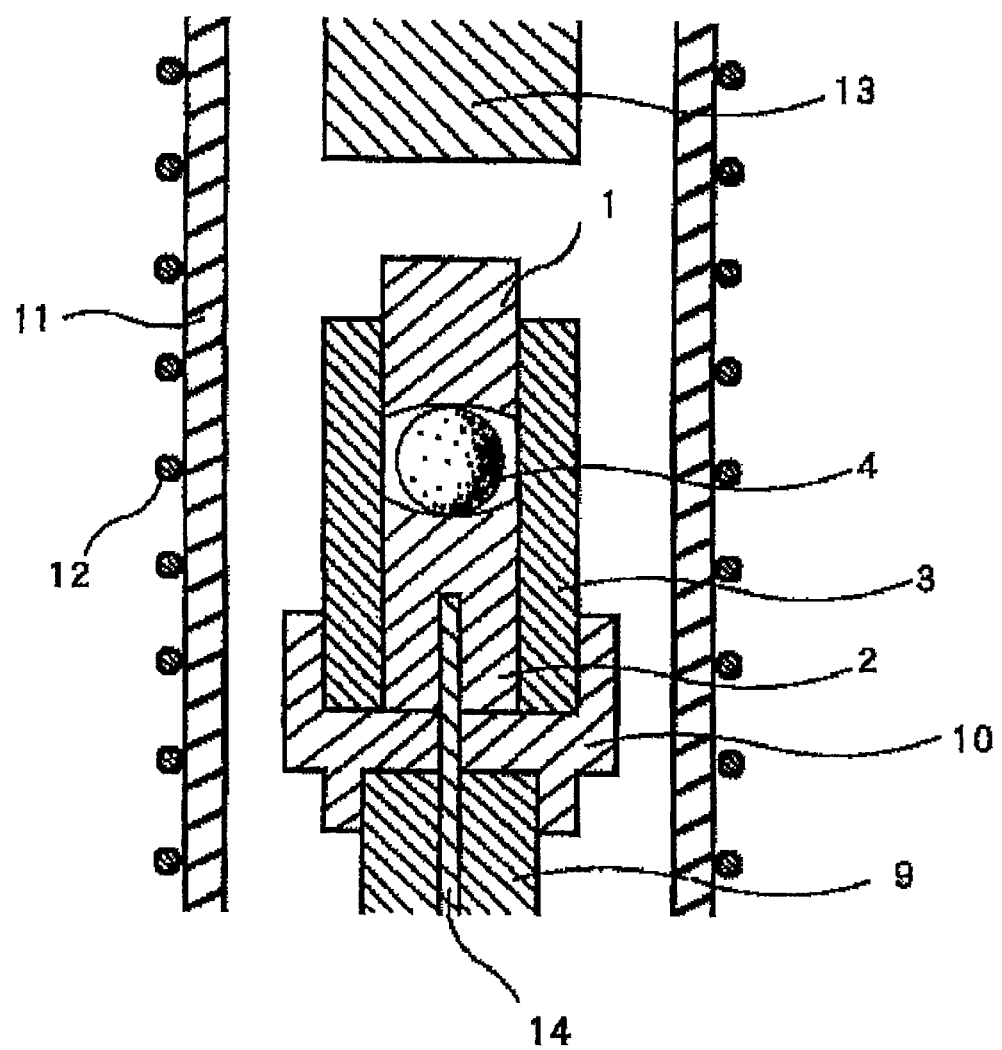

OPTICAL GLASS, PREFORM FOR PRESS FORMING, OPTICAL ELEMENT, AND PROCESSES FOR PRODUCING THESE

This application is a divisional of application Ser. No. 12/528,189 filed Sep. 3, 2009, now allowed, which in turn is the U.S. national phase of International Application No. PCT/JP2008/053897 filed Feb. 27, 2008 which designated the U.S. and claims priority to JP Application No. 2007-055316 filed Mar. 6, 2007; the entire contents of each of which are hereby incorporated by reference.

TECHNICAL FIELD

The present invention relates to a fluorophosphate optical glass and process for the production thereof, a press-molding preform and a process for the production thereof and an optical element and a process for the production thereof.

TECHNICAL BACKGROUND

A fluorophosphate optical glass is very useful as a low-dispersion glass, and as such a glass, a glass described in JP10-139451A is known.

DISCLOSURE OF THE INVENTION

When a fluorophosphate glass is produced by heating and melting raw materials, a glass component volatilizes from the surface of a glass under the heated of a high temperature. The amount of a glass obtained is hence decreased relative to the amount of raw materials used, and properties such as a refractive index, etc., come to deviate from intended values. It is therefore required to take some measures such as a little increase in amount when a raw material batch is prepared, with regard to the component that is lost by volatilization. However, such measures can be no fundamental solution for preventing the volatilization of the above glass components. Further, when a glass is shaped into a glass shaped material by causing an optical glass in a molten state to flow out of a pipe and casting it into a mold, a glass component also volatilizes to cause an optically non-uniform portion called striae in a layer in the vicinity of the surface of the glass shaped material.

The present invention has been made in the light of the above circumstances, and the object thereof is to provide a low-dispersion optical glass and a process for the production thereof, which are capable of suppressing the volatilization of a glass component and the variation of quality involved in the fluctuations of a glass composition when an optical glass formed of a fluorophosphate glass is produced or when the produced glass in a molten state is caused to flow out of a pipe and shaped into a glass shaped material.

Further, it is another object of the present invention to provide a press-molding preform formed of the above optical glass and a process for the production thereof, an optical element blank formed of the above glass and a process for the production thereof and an optical element and a process for the production thereof.

Means to Solve the Problems

The present inventor has made diligent studies, and it has been found that the above object can be achieved by an optical glass which is formed of a fluorophosphate glass having an $O^{2-}$ content/$P^{5+}$ content molar ratio, $O^{2-}/P^{5+}$, of 3.5 or more and which has an Abbe's number ($v_d$) of over 70, an optical glass which is formed of a fluorophosphate glass having an $O^{2-}$ content/$P^{5+}$ content molar ratio, $O^{2-}/P^{5+}$, of 3.5 or more and which has an Abbe's number ($v_d$) of over 78, an optical glass which is formed of a fluorophosphate glass having an $O^{2-}$ content/$P^{5+}$ content molar ratio, $O^{2-}/P^{5+}$, of 3.5 or more, having a total rare earth element content of less than 5 cationic % and having an $F^-$ content/$F^-$ and $O^{2-}$ total content molar ratio, $F^-/(F^-+O^{2-})$, of over 0.2 and which has a refractive index ($n_d$) of over 1.53 and an Abbe's number ($v_d$) of over 70, and an optical glass formed of a fluorophosphate glass comprising $P^{5+}$ as a cationic component and $F^-$ and $O^{2-}$ as anionic components and having an $F^-$ content of 65 anionic % or more and having an $O^{2-}$ content/$P^{5+}$ content molar ratio, $O^{2-}/P^{5+}$, of 3.5 or more. On the basis of the above finding, the present invention has been completed.

That is, the present invention provides (1) an optical glass that has an Abbe's number ($v_d$) of over 70 and that is formed of a fluorophosphate glass having an $O^{2-}$ content/$P^{5+}$ content molar ratio, $O^{2-}/P^{5+}$, of 3.5 or more (to be referred to as "optical glass I" of the present invention hereinafter), (2) an optical glass as recited in the above (1), which has an Abbe's number ($v_d$) of over 78 (to be referred to as "optical glass II" of the present invention hereinafter), (3) an optical glass as recited in the above (1), which is formed of a fluorophosphate glass having a refractive index ($n_d$) of over 1.53, having a total rare earth element content of less than 5 cationic % and having an $F^-$ content/$F^-$ and $O^{2-}$ total content molar ratio, $F^-/(F^-+O^{2-})$, of over 0.2 (to be referred to as "optical glass III" of the present invention hereinafter), (4) an optical glass as recited in the above (1), wherein said fluorophosphate glass comprises, by cationic %,
3 to 50% of $P^{5+}$,
5 to 40% of $Al^{3+}$,
0 to 10% of $Mg^{2+}$,
0 to 30% of $Ca^{2+}$,
0 to 30% of $Sr^{2+}$,
0 to 40% of $Ba^{2+}$,
provided that the total content of $Mg^{2+}$, $Ca^{2+}$, $Sr^{2+}$ and $Ba^{2+}$ is 10% or more,
0 to 30% of $Li^+$,
0 to 20% of $Na^+$,
0 to 20% of $K^+$,
0 to 10% of $Y^{3+}$,
0 to 10% of $La^{3+}$,
0 to 10% of $Gd^{3+}$,
0 to 10% of $Yb^{3+}$,
0 to 10% of $B^{3+}$,
0 to 20% of $Zn^{2+}$ and
0 to 20% of $In^{3+}$,
and comprises, by anionic %,
20 to 95% of $F^-$ and
5 to 80% of $O^{2-}$, (5) an optical glass as recited in the above (2), wherein said fluorophosphate glass comprises, by cationic %,
3 to 30% of $P^{5+}$,
10 to 40% of $Al^{3+}$,
0 to 10% of $Mg^{2+}$,
0 to 30% of $Ca^{2+}$,
0 to 30% of $Sr^{2+}$,
0 to 30% of $Ba^{2+}$,
provided that the total content of $Mg^{2+}$, $Ca^{2+}$, $Sr^{2+}$ and $Ba^{2+}$ is 10% or more,
0 to 30% of $Li^+$,
0 to 20% of $Na^+$, 0 to 20% of $K^+$,
0 to 10% of $Y^{3+}$,
0 to 10% of $La^{3+}$,
0 to 10% of $Gd^{3+}$,
0 to 10% of $Yb^{3+}$,
0 to 10% of $B^{3+}$,
0 to 20% of $Zn^{2+}$ and
0 to 20% of $In^{3+}$,
and comprises, by anionic %,
40 to 95% of $F^-$ and
5 to 60% of $O^{2-}$, (6) an optical glass as recited in the above (3), wherein said fluorophosphate glass comprises, by cationic %,
20 to 50% of $P^{5+}$,
5 to 40% of $Al^{3+}$,
0 to 10% of $Mg^{2+}$,
0 to 20% of $Ca^{2+}$,
0 to 20% of $Sr^{2+}$,
0 to 40% of $Ba^{2+}$,
provided that the total content of $Mg^{2+}$, $Ca^{2+}$, $Sr^{2+}$ and $Ba^{2+}$ is 10% or more,
0 to 30% of $Li^+$,
0 to 20% of $Na^+$,
0 to 20% of $K^+$,
0 to 5% of $Y^{3+}$, exclusive of 5%,
0 to 5% of $La^{3+}$, exclusive of 5%,
0 to 5% of $Gd^{3+}$, exclusive of 5%,
0 to 5% of $Yb^{3+}$, exclusive of 5%,
provided that the total content of $Y^{3+}$, $La^{3+}$, $Gd^{3+}$ and $Yb^{3+}$ is less than 5%,
0 to 10% of $B^{3+}$,
0 to 20% of $Zn^{2+}$ and
0 to 20% of $In^{3+}$, (7) an optical glass as recited in the above (1) or (2), wherein the fluorophosphate glass has an $F^-$ content of 65 anionic % or more, (8) an optical glass formed of a fluorophosphate glass comprising $P^{5+}$ as a cationic component and comprising $F^-$ and $O^{2-}$ as anionic components, the fluorophosphate glass having an $F^-$ content of 65 anionic % or more and an $O^{2-}$ content/$P^{5+}$ content molar ratio, $O^{2-}/P^{5+}$, of 3.5 or more (to be referred to as "optical glass IV" of the present invention hereinafter), (9) an optical glass as recited in the above (8), which comprises, by cationic %,
3 to 15% of $P^{5+}$,
25 to 40% of $Al^{3+}$,
5 to 35% of $Ca^{2+}$, and
5 to 25% of $Sr^{2+}$,

(10) an optical glass as recited in the above (9), which comprises, by cationic %,
0 to 10% of $Mg^{2+}$,
0 to 20% of $Ba^{2+}$,
0 to 20% of $Li^+$,
0 to 10% of $Na^+$,
0 to 10% of $K^+$, and
0 to 5% of $Y^{3+}$,

(11) a process for the production of an optical glass formed of a fluorophosphate glass, which comprises using, as raw materials or cullet, a glass composition having a total $O^{2-}$ content/total $P^{5+}$ content molar ratio, $O^{2-}/P^{5+}$, of 3.5 or more when an optical glass is produced by melting the raw materials or cullet and refining and homogenizing a molten glass, and thereby producing the optical glass recited in any one of the above (1) to (10),

(12) a process for the production of an optical glass formed of a fluorophosphate glass, which comprises preparing a raw material batch from raw materials or cullet, melting the raw material batch and then carrying out refining and homogenization,
the process comprising preparing the raw material batch in which the total $O^{2-}$ content/total $P^{5+}$ content molar ratio, $O^{2-}/P^{5+}$, is 3.5 or more and carrying out the melting, refining and homogenization to produce a fluorophosphate glass having an Abbe's number ($v_d$) of over 70,

(13) a process for the production of an optical glass formed of a fluorophosphate glass, which comprises preparing a raw material batch from raw materials or cullet, melting the raw material batch, then carrying out refining and homogenization to prepare a molten glass and shaping said molten glass,
the process comprising controlling the total $O^{2-}$ content/total $P^{5+}$ content molar ratio, $O^{2-}/P^{5+}$, in said raw material batch for decreasing the volatility of said molten glass,

(14) a process for the production of an optical glass as recited in the above (13), wherein the fluorophosphate glass having an Abbe's number ($v_d$) of over 70 is produced,

(15) a process for the production of an optical glass as recited in the above (12) or (14), wherein the fluorophosphate glass having an Abbe's number ($v_d$) of over 78 is produced,

(16) a process for the production of an optical glass as recited in any one of the above (12) to (14), wherein the fluorophosphate glass having a rare earth element total content of less than 5 cationic %, an $F^-$ content/$F^-$ and $O^{2-}$ total content molar ratio, $F^-/(F^-+O^{2-})$, of over 0.2 and a refractive index ($n_d$) of over 1.53 is produced,

(17) a process for the production of an optical glass as recited in any one of the above (12) to (15), wherein the fluorophosphate glass having an $F^-$ content of 65 anionic % or more is produced,

(18) a press-molding preform formed of the optical glass recited in any one of the above (1) to (10) or an optical glass obtained by the process recited in any one of the above (11) to (17),

(19) a process for the production of a press-molding preform, which comprises causing a molten glass to flow out of a pipe to separate a molten glass gob having a predetermined weight and shaping said glass gob into a preform when the glass goes through a process of cooling,
the process comprising shaping the press-molding preform recited in the above (18),

(20) a process for the production of a press-molding preform, which comprises casting a molten glass into a casting mold to prepare a glass shaped material and processing said glass shaped material to make the press-molding preform,
the process comprising shaping the press-molding preform recited in the above (18),

(21) an optical element blank for an optical element that is completed by grinding and polishing, which is formed of the optical glass recited in any one of the above (1) to (10) or an optical glass obtained by the process recited in any one of the above (11) to (17),

(22) an optical element formed of the optical glass recited in any one of the above (1) to (10) or an optical glass obtained by the process recited in any one of the above (11) to (17),

(23) a process for the production of an optical element blank from which an optical element is completed by grinding and polishing,
which comprises heating and press-molding the preform recited in the above (18) or a preform obtained by the process recited in the above (19) or (20),

(24) a process for the production of an optical element blank, which comprises melting glass raw materials, causing the resultant molten glass to flow out, separating a molten glass gob from the molten glass flow and press-molding said molten glass gob, the process comprising melting and molding the optical glass recited in any one of the above (1) to (10) or an optical glass obtained by the process recited in any one of the above (11) to (17),

(25) a process for the production of an optical element, which comprising grinding and polishing the optical element blank recited in the above (21) or an optical element blank produced by the process recited in the above (23) or (24), and

(26) A process for the production of an optical element, which comprises heating and precision press-molding the preform recited in the above (18) or a preform obtained by the process recited in the above (19) or (20).

EFFECT OF THE INVENTION

According to the present invention, there can be provided a low-dispersion optical glass and a process for the production thereof, which are capable of suppressing the volatilization of a glass component and the variation of quality involved in the fluctuations of a glass composition when an optical glass formed of a fluorophosphate glass is produced or when the produced glass in a molten state is caused to flow out of a pipe and shaped into a glass shaped material.

According to the present invention, further, there can be provided a press-molding preform formed of the above optical glass and a process for the production thereof, an optical element blank formed of the above glass and a process for the production thereof and an optical element and a process for the production thereof.

BRIEF DESCRIPTION OF THE DRAWING

FIG. 1 is a schematic drawing of a precision press-molding apparatus used in Examples of the present invention.

BEST MODES FOR WORKING THE INVENTION

The present invention suppresses the formation of volatile substances formed in the step of melting a glass in prior art and decreases the volatility of a glass to a great extent.
[Optical Glass]

The optical glass of the present invention will be explained below. In descriptions hereinafter, "%" for a content of a cationic component or a total content of cationic components stands for "cationic %", and "%" for a content of an anionic component or a total content of anionic components stands for "anionic %", unless otherwise specified.
(Optical Glass I)

First, the optical glass I of the present invention will be explained.

The optical glass I of the present invention is an optical glass formed of a fluorophosphate glass having an Abbe's number ($v_d$) of over 70 and having an $O^{2-}$ content/$P^{5+}$ content molar ratio of 3.5 or more.

In the fluorophosphate glass having an Abbe's number ($v_d$) of over 70 and having an $O^{2-}$ content/$P^{5+}$ content molar ratio, $O^{2-}/P^{5+}$, of 3.5 or more, for constituting the optical glass I, the $O^{2-}$ content/$P^{5+}$ content molar ratio, $O^{2-}/P^{5+}$, is preferably 3.53 or more, more preferably 3.55 or more.

In the optical glass I of the present invention, further, the Abbe's number ($v_d$) is preferably over 75, more preferably 78 or more, still more preferably 80 or more.

As described already, when a fluorophosphate glass having the property of low dispersion as represented by an Abbe's number ($v_d$) of over 70 is produced, glass components volatilize when the glass is produced or when a molten glass is caused to flow out. When the present inventor has made studies, surprisingly, it has been found that the above volatilization can be suppressed by employing a fluorophosphate glass having an $O^{2-}$ content/$P^{5+}$ content molar ratio, $O^{2-}/P^{5+}$, of 3.5 or more.

That is, as a raw material for the above fluorophosphate glass, generally, phosphate is used, and for introducing fluorine ($F^-$) as an anionic component as much as possible, it is general practice to use metaphosphate (oxygen atom/phosphorus atom=3) in which the ratio of the number of oxygen ($O^{2-}$) atoms per atom of phosphorus ($P^{5+}$) is small.

According to studies made by the present inventor, when a glass is produced from the above metaphosphate as a raw material, metaphosphoric acid derived from the raw material and fluorine react with each other in a molten glass to generate phosphoryl fluoride ($POF_3$) as a volatile component. In contrast, it has been found that when the atomic ratio of oxygen atoms per phosphorus atom in the molten glass is adjusted to 3.5 or more (oxygen atom/phosphorus atom≥3.5), the generation amount of a volatile component is decreased to a great extent. It is considered that the above is because diphosphoric acid in which the ratio of number of oxygen ($O^{2-}$) atoms per atom of phosphorus ($P^{5+}$) (oxygen atom/phosphorus atom) is 3.5 is more stable as a phosphoric acid in a molten glass than metaphosphoric acid in which the ratio of number of oxygen ($O^{2-}$) atoms per atom of phosphorus ($P^{5+}$) (oxygen atom/phosphorus atom) is 3.

In the optical glass of the present invention, therefore, the molar ratio of the content of $O^{2-}$ to the content of $P^{5+}$ in a fluorophosphate glass is limited to 3.5 or more and a metaphosphoric-acid-free glass is formed. The generation of phosphoryl fluoride as a volatile component is hence suppressed, and the variation of quality involved in the fluctuations of a glass composition is hence decreased.

The optical glass I preferably includes the following optical glass I-a.

The optical glass I-a is a fluorophosphate glass which comprises, as cationic components, 3 to 50% of $P^{5+}$,
5 to 40% of $Al^{3+}$,
0 to 10% of $Mg^{2+}$,
0 to 30% of $Ca^{2+}$,
0 to 30% of $Sr^{2+}$,
0 to 40% of $Ba^{2+}$,
provided that the total content of $Mg^{2+}$, $Ca^{2+}$, $Sr^{2+}$ and $Ba^{2+}$ is 10% or more,
0 to 30% of $Li^+$,
0 to 20% of $Na^+$,
0 to 20% of $K^+$,
0 to 10% of $Y^{3+}$,
0 to 10% of $La^{3+}$,
0 to 10% of $Gd^{3+}$,
0 to 10% of $Yb^{3+}$,
0 to 10% of $B^{3+}$,
0 to 20% of $Zn^{2+}$ and
0 to 20% of $In^{3+}$,
and comprises, as anionic components,
20 to 95% of $F^-$ and
5 to 80% of $O^{2-}$.

$P^{5+}$ is an essential component that works as a network former in the glass. When the content thereof is less than 3%, the glass is extremely unstable. When the content thereof exceeds 50%, it is required for adjusting the $O^{2-}/P^{5+}$ molar ratio to 3.5 or more to limit the content of fluorine to be introduced, and the necessary low-dispersion property can be no longer obtained. The content of $P^{5+}$ is therefore preferably adjusted to the range of 3 to 50%.

$Al^{3+}$ is an essential component for improving the stability of the fluorophosphate glass. When the content thereof is less than 5%, the glass is destabilized. When the content thereof exceeds 40%, the total content of the other components is too small, and the glass is destabilized. The content of $Al^{3+}$ is therefore preferably adjusted to the range of 5 to 40%.

Alkaline earth metals such as $Mg^{2+}$, $Ca^{2+}$, $Sr^{2+}$ and $Ba^{2+}$ are components that improve the stability of the glass and increase the refractive index. When the total content thereof is adjusted to 10% or more, the effect thereof on the stability is increased. However, when the content of a particular alkaline earth metal component is too large, the balance with other components is broken. Therefore, it is preferred to introduce them evenly, and it is preferred to introduce at least two members of $Mg^{2+}$, $Ca^{2+}$, $Sr^{2+}$ and $Ba^{2+}$. Specifically, preferably, the content of $Mg^{2+}$ is limited to 0 to 10%, the content of $Ca^{2+}$ is limited to 0 to 30%, the content of $Sr^{2+}$ is limited to 0 to 30% and the content of $Ba^{2+}$ is limited to 0 to 40%.

Alkali metals such as $Li^+$, $Na^+$ and $K^+$ are components that decrease the glass viscosity and the glass transition temperature to expedite the production of the glass. When they are introduced to excess, however, they degrade the glass stability. Therefore, preferably, the content of $Li^+$ is limited to 0 to 30%, the content of $Na^+$ is limited to 0 to 20%, and the content of $K^+$ is limited to 0 to 20%. Of the alkali metals, $Li^+$ also has a high effect on improvement of the stability. Therefore, it is more preferred to introduce 0.5% or more of $Li^+$, it is still more preferred to introduce 1% or more of $Li^+$, and it is particularly preferred to introduce 2% or more of $Li^+$.

Rare earth elements such as $Y^{3+}$, $La^{3+}$, $Gd^{3+}$, $Yb^{3+}$, etc., are components that increase the refractive index while maintaining the low-dispersion property of the glass. When they are introduced to excess, however, they increase the melting temperature of the glass and also decrease the glass stability. It is therefore preferred to limit the content of each of the above components to 0 to 10%.

$B^{3+}$ is a component that improves the durability of the glass. Since, however, it tends to volatilize as a fluoride during melting, it is also a component that decreases productivity. Therefore, it is preferred to limit the content of $B^{3+}$ to 0 to 10%, and it is more preferred to limit the content thereof to 0 to 5%. It is still more preferred to introduce no $B^{3+}$.

$Zn^{2+}$ and $In^{3+}$ have the property that they can be easily introduced into the glass like alkaline earth metals, and when $Zn^{2+}$ and $In^{3+}$ are introduced to form a multi-component glass, it is expected that there is produced an effect that the stability is improved. However, it is undesirable to introduce them to excess. Therefore, it is preferred to limit the content of each of $Zn^{2+}$ and $In^{3+}$ to 0 to 20%, it is more preferred to limit the content of each of $Zn^{2+}$ and $In^{3+}$ to 0 to 10%, and it is still more preferred to limit the content of each of $Zn^{2+}$ and $In^{3+}$ to 0 to 5%. It is particularly preferred to introduce none of $Zn^{2+}$ and $In^{2+}$.

In addition to the low-dispersion property and anomalous partial dispersion property, the optical glass I also has the property of exhibiting a high light transmittance in a broad region from short-wavelengths to long-wavelengths in the visible light region. When these properties are to be utilized, the optical glass I is suitable as a material for obtaining various optical elements such as a lens, a prism and the like. For the above use fields, it is preferred not to add ions having absorption in the visible light region, e.g., ions of metal elements such as Fe, Cu, Ni, Co, Cr, Mn, V, Nd, Ho and Er.

On the other hand, the optical glass I can be imparted with the property of near infrared absorption by adding $Cu^{2+}$. It is hence desirable to add 0.5 to 13% of $Cu^{2+}$ per 100% of the glass composition excluding $Cu^{2+}$. The glass containing $Cu^{2+}$ is suitable as a material for color collection filters for semiconductor image sensing devices such as CCD, CMOS, etc. The amount of $Cu^{2+}$ can be properly determined in the above range while taking account of the thickness of the above filters. In the glass containing $Cu^{2+}$, it is desirable not to add any other ion having absorption in the visible light region than $Cu^{2+}$ unless the absorption characteristic is to be adjusted.

Anion components and anion additives will be explained below. The optical glass I is a fluorophosphate glass, and $F^-$ and $O^{2-}$ are essential anion components. For materializing the predetermined optical properties and excellent glass stability, it is preferred to introduce 20 to 95% of $F^-$ and 5 to 80% of $O^{2-}$.

Further, when $Cl^-$, $Br^-$ and $I^-$ are introduced in a small amount, the fluorophosphate glass is not easily wetted on platinum products such as a platinum vessel, a nozzle made of platinum, etc., which are used when the glass is produced or when the glass is caused to flow out. Therefore, the glass can be easily produced. When $Cl^-$, $Br^-$ and $I^-$ are introduced to excess, they cause the variation of the refractive index because of the volatilization of a component and the occurrence of platinum foreign matter. Therefore, it is preferred to limit the total content of them to 0 to 3%, and it is more preferred to limit the above total content to 0.1 to 3%.

For achieving the object of the present invention, it is preferred to adjust the total content of $F^-$, $O^{2-}$, $Cl^-$, $Br^-$ and $I^-$ to 98 anionic % or more, it is more preferred to adjust the above total content to 99 anionic % or more, and it is still more preferred to adjust the above total content to 100 anionic %.

(Optical Glass II)

The optical glass II of the present invention will be explained below.

The optical glass II of the present invention is an optical glass I that is formed of a fluorophosphate glass having an $O^{2-}$ content/$P^{5+}$ content molar ratio, $O^{2-}/P^{5+}$, of 3.5 or more and that has an Abbe's number ($v_d$) of over 78.

In the optical glass II, the molar ratio of the content of $O^{2-}$ to the content of $P^{5+}$, $O^{2-}/P^{5+}$, is preferably 3.55 or more, more preferably 3.6 or more.

The optical glass II of the present invention can be said to be one embodiment of the above optical glass I of the present invention. When the present inventor has made further studies with regard to the above optical glass I of the present invention, the following has been found. In an optical glass formed of a fluorophosphate glass in particular having an Abbe's number ($v_d$) of over 78, a large amount of metaphosphoric acid is used as a raw material for introducing an increased amount of fluorine ($F^-$), and it promotes the above volatilization of phosphoryl fluoride. The invention of the optical glass II has been accordingly completed on the basis of the above finding.

The optical glass II preferably includes the following optical glass II-a.

The optical glass II-a is a fluorophosphate glass that comprises, as cation components and by cationic %, 3 to 30% of $P^{5+}$,
10 to 40% of $Al^{3+}$,
0 to 10% of $Mg^{2+}$,
0 to 30% of $Ca^{2+}$,
0 to 30% of $Sr^{2+}$,
0 to 30% of $Ba^{2+}$,
provided that the total content of $Mg^{2+}$, $Ca^{2+}$, $Sr^{2+}$ and $Ba^{2+}$ is 10% or more, 0 to 30% of $Li^+$,
0 to 20% of $Na^+$,
0 to 20% of $K^+$,
0 to 10% of $Y^{3+}$,
0 to 10% of $La^{3+}$,
0 to 10% of $Gd^{3+}$,
0 to 10% of $Yb^{3+}$,
0 to 10% of $B^{3+}$,
0 to 20% of $Zn^{2+}$ and
0 to 20% of $In^{3+}$,
and comprises, by anionic %,
40 to 95% of $F^-$ and
5 to 60% of $O^{2-}$.

$P^{5+}$ is an essential component that works as a network former in the glass. When the content thereof is less than 3%, the glass is extremely unstable. When the content thereof exceeds 30%, it is required for adjusting the $O^{2-}/P^{5+}$ molar ratio to 3.5 or more to limit the content of fluorine to be introduced, and the necessary low-dispersion property can be no longer obtained. The content of $P^{5+}$ is therefore preferably adjusted to the range of 3 to 30%.

$Al^{3+}$ is an essential component for improving the stability of the fluorophosphate glass. When the content thereof is less than 10%, the glass is destabilized. When the content thereof exceeds 40%, the total content of the other components is too small, and the glass is destabilized. The content of $Al^{3+}$ is therefore preferably adjusted to the range of 10 to 40%.

Alkaline earth metals such as $Mg^{2+}$, $Ca^{2+}$, $Sr^{2+}$ and $Ba^{2+}$ are components that improve the stability of the glass and increase the refractive index. When the total content thereof is adjusted to 10% or more, the effect thereof on the stability is increased. However, when the content of a particular alkaline earth metal component is too large, the balance with other components is broken. Therefore, it is preferred to introduce them evenly, and it is preferred to introduce at least two members of $Mg^{2+}$, $Ca^{2+}$, $Sr^{2+}$ and $Ba^{2+}$. Specifically, preferably, the content of $Mg^{2+}$ is limited to 0 to 10%, the content of $Ca^{2+}$ is limited to 0 to 30%, the content of $Sr^{2+}$ is limited to 0 to 30% and the content of $Ba^{2+}$ is limited to 0 to 30%.

Alkali metals such as $Li^+$, $Na^+$ and $K^+$ are components that decrease the glass viscosity and the glass transition temperature to expedite the production of the glass. When they are introduced to excess, however, they degrade the glass stability. Therefore, preferably, the content of $Li^+$ is limited to 0 to 30%, the content of $Na^+$ is limited to 0 to 20%, and the content of $K^+$ is limited to 0 to 20%. Of the alkali metals, $Li^+$ also has a high effect on improvement of the stability. Therefore, it is more preferred to introduce 0.5% or more of $Li^+$, it is still more preferred to introduce 1% or more of $Li^+$, and it is particularly preferred to introduce 2% or more of $Li^+$.

Rare earth elements such as $Y^{3+}$, $La^{3+}$, $Gd^{3+}$, $Yb^{3+}$, etc., are components that increase the refractive index while maintaining the low-dispersion property of the glass. When they are introduced to excess, however, they increase the melting temperature of the glass and also decrease the glass stability. It is therefore preferred to limit the content of each of the above components to 0 to 10%.

$B^{3+}$ is a component that improves the durability of the glass. Since, however, it tends to volatilize as a fluoride during melting, it is also a component that decreases productivity. Therefore, it is preferred to limit the content of $B^{3+}$ to 0 to 10%, it is more preferred to limit the content thereof to 0 to 5%, and it is still more preferred to limit the content thereof to 0 to 1%. It is particularly preferred to introduce no $B^{3+}$.

$Zn^{2+}$ and $In^{3+}$ have the property that they can be easily introduced to the glass like alkaline earth metals, and when $Zn^{2+}$ and $In^{3+}$ are introduced to form a multi-component glass, it is expected that there is produced an effect that the stability is improved. However, it is undesirable to introduce them to excess. Therefore, it is preferred to limit the content of each of $Zn^{2+}$ and $In^{3+}$ to 0 to 20%, it is more preferred to limit the content of each of $Zn^{2+}$ and $In^{3+}$ to 0 to 10%, and it is still more preferred to limit the content of each of $Zn^{2+}$ and $In^{3+}$ to 0 to 5%. It is particularly preferred to introduce none of $Zn^{2+}$ and $In^{3+}$.

In addition to the low-dispersion property and anomalous partial dispersion property, the optical glass II also has the property of exhibiting a high light transmittance in a broad region from short-wavelengths to long-wavelengths in the visible light region. When these properties are to be utilized, the optical glass II is suitable as a material for obtaining various optical elements such as a lens, a prism and the like. For the above use fields, it is preferred not to add ions having absorption in the visible light region, e.g., ions of metal elements such as Fe, Cu, Ni, Co, Cr, Mn, V, Nd, Ho and Er.

On the other hand, the optical glass II can be imparted with the property of near infrared absorption by adding $Cu^{2+}$. It is hence desirable to add 0.5 to 13% of $Cu^{2+}$ per 100% of the glass composition excluding $Cu^{2+}$. The glass containing $Cu^{2+}$ is suitable as a material for color collection filters for semiconductor image sensing devices such as CCD, CMOS, etc. The amount of $Cu^{2+}$ can be property determined in the above range while taking account of the thickness of the above filters. In the glass containing $Cu^{2+}$, it is desirable not to add any other ion having absorption in the visible light region than $Cu^{2+}$ unless the absorption characteristic is to be adjusted.

Anion components and anion additives will be explained below. The optical glass II is a fluorophosphate glass, and $F^-$ and $O^{2-}$ are essential anion components. For materializing the predetermined optical properties and excellent glass stability, it is preferred to introduce 40 to 95% of $F^-$ and 5 to 60% of $O^{2-}$.

Further, when $Cl^-$, $Br^-$ and $I^-$ are introduced in a small amount, the fluorophosphate glass is not easily wetted on platinum products such as a platinum vessel, a nozzle made of platinum, etc., which are used when the glass is produced or when the glass is caused to flow out. Therefore, the glass can be easily produced. When $Cl^-$, $Br^-$ and $I^-$ are introduced to excess, they cause the variation of the refractive index because of the volatilization of a component and the occurrence of platinum foreign matter. Therefore, it is preferred to limit the total content of them to 0 to 3%, and it is more preferred to limit the above total content to 0.1 to 3%.

For achieving the object of the present invention, it is preferred to adjust the total content of $F^-$, $O^{2-}$, $Cl^-$, $Br^-$ and $I^-$ to 98 anionic % or more, it is more preferred to adjust the above total content to 99 anionic % or more, and it is still more preferred to adjust the above total content to 100 anionic %.

The $F^-$ content in each of the optical glass I and the optical glass II is adjusted to 65 anionic % or more for obtaining the property of lower dispersion. A glass having such a large $F^-$ content has very low viscosity in a molten state and conventionally, it has a problem that the occurrence of striae and the variation of the refractive index, which are caused by volatilization, are severe in particular. According to the optical glass I and the optical glass II each of which has an $F^-$ content of 65 anionic % or more, their property of volatilization is suppressed to a great extent, and the above problem can be hence overcome. Further, not only the property of ultra-low dispersion but also the property of anomalous dispersion thereof can be increased.

(Optical Glass III)

The optical glass III can be said to be one embodiment of the above optical glass I of the present invention. The optical glass III is formed of a fluorophosphate glass having an $O^{2-}$ content/$P^{5+}$ content molar ratio, $O^{2-}/P^{5+}$, of 3.5 or more, having a rare earth element content of less than 5 cationic % and having an $F^-$ content/$F^-$ and $O^{2-}$ total content molar ratio, $F^-/(F^-+O^{2-})$, of over 0.2, and has a refractive index ($n_d$) of over 1.53 and an Abbe's number ($v_d$) of over 70.

That is, the optical glass III is an optical glass I formed of a fluorophosphate glass having a refractive index ($n_d$) of over 1.53, having a rare earth element total content of less than 5 cationic % and having an $F^-$ content/$F^-$ and $O^{2-}$ total content molar ratio, $F^-/(F^-+O^{2-})$, of over 0.2. In the optical glass III, the total content of rare earth elements (cationic components of rare earth elements) is preferably 4% or less, more preferably 3% or less. When the total content of the rare earth elements is 5% or more, the melting temperature and the liquidus temperature (molding temperature) of the glass are increased, and the glass is hard to separate or mold as will be described later.

In the optical glass III, the $F^-$ content/$F^-$ and $O^{2-}$ total content molar ratio, $F^-/(F^-+O^{2-})$, is preferably 0.3 or more, more preferably 0.4 or more. When the $F^-$ content/$F^-$ and $O^{2-}$ total content molar ratio, $F^-/(F^-+O^{2-})$, is 0.2 or less, the intended anomalous dispersion property can be no longer obtained.

In the optical glass III, the refractive index ($n_d$) is preferably 1.54 or more, more preferably 1.55 or more.

The optical glass III of the present invention can be also said to be one embodiment of the above optical glass I of the present invention. When the present inventor made further studies with regard to the above optical glass I of the present invention, the following has been found and the invention of the optical glass III has been accordingly completed on the basis of the finding.

As a high-refractivity low-dispersion fluorophosphate glass having a refractive index ($n_d$) of over 1.53 and an Abbe's number ($v_d$) of over 70, there is known a glass having a rare earth metal content of 5 cationic % or more. This glass contains a large amount of a rare earth metal and eventually has both a high melting temperature and a high liquidus temperature (molding temperature). The volatilization amount of the above glass component increases with an increase in the temperature for causing a molten glass to flow out or the temperature for molding, so that it is preferred to decrease the temperature for causing a molten glass to flow out or the temperature for molding to the lowest possible level. The above glass containing a large amount of a rare earth element has a high melting temperature and a high liquidus temperature (molding temperature), and therefore, when an attempt is made to decrease the temperature for causing a molten glass to flow out or the temperature for molding, the viscosity of the glass is high when it is caused to flow out or molded, and it is difficult to separate a glass or mold the glass well. In the optical glass III, therefore, the $O^{2-}$ content/$P^{5+}$ content molar ratio, $O^{2-}/P^{5+}$, is limited to 3.5 or more and the total content of rare earth elements is limited to less than 5 cationic %, for suppressing the volatilization of the glass component.

The optical glass III includes the following optical glass III-a.

The optical glass III-a is a fluorophosphate glass comprising, by cationic %,
20 to 50% of $P^{5+}$,
5 to 40% of $Al^{3+}$,
0 to 10% of $Mg^{2+}$,
0 to 20% of $Ca^{2+}$,
0 to 20% of $Sr^{2+}$,
0 to 40% of $Ba^{2+}$,
provided that the total content of $Mg^{2+}$, $Ca^{2+}$, $Sr^{2+}$ and $Ba^{2+}$ is 10% or more,
0 to 30% of $Li^+$,
0 to 20% of $Na^+$,
0 to 20% of $K^+$,
0 to 5% of $Y^{3+}$, exclusive of 5%,
0 to 5% of $La^{3+}$, exclusive of 5%,
0 to 5% of $Gd^{3+}$, exclusive of 5%,
0 to 5% of $Yb^{3+}$, exclusive of 5%,
provided that the total content of $Y^{3+}$, $La^{3+}$, $Gd^{3+}$ and $Yb^{3+}$ is less than 5%,
0 to 10% of $B^{3+}$,
0 to 20% of $Zn^{2+}$ and
0 to 20% of $In^{3+}$.

$P^{5+}$ is an essential component that works as a network former in the glass, and it is particularly important for a glass having a relatively small fluorine content. When the content of $P^{5+}$ is less than 20%, the glass is extremely unstable. When the content thereof exceeds 50%, it is required for adjusting the $O^{2-}/P^{5+}$ molar ratio to 3.5 or more to limit the content of fluorine to be introduced, and the necessary low-dispersion property can be no longer obtained. The content of $P^{5+}$ is therefore preferably adjusted to the range of 20 to 50%.

$Al^{3+}$ is an essential component for improving the stability of the fluorophosphate glass, and it also has a high effect that a glass having a small content of fluorine is improved in durability. When the content of $Al^{3+}$ is less than 5%, the glass is destabilized and greatly degraded in durability. When the content thereof exceeds 40%, the total content of the other components is too small, and the glass is destabilized. The content of $Al^{3+}$ is therefore preferably adjusted to the range of 5 to 40%.

Alkaline earth metals such as $Mg^{2+}$, $Ca^{2+}$, $Sr^{2+}$ and $Ba^{2+}$ are components that improve the stability of the glass and increase the refractive index. When the total content thereof is adjusted to 10% or more, the effect thereof on the stability is increased. However, when the content of a particular alkaline earth metal component is too large, the balance with other components is broken. Therefore, it is preferred to introduce them evenly, and it is preferred to introduce at least two members of $Mg^{2+}$, $Ca^{2+}$, $Sr^{2+}$ and $Ba^{2+}$. Further, when much $Ba^{2+}$ is introduced for increasing the refractive index, the glass having a small fluorine content is improved in stability. Specifically, preferably, the content of $Mg^{2+}$ is limited to 0 to 10%, the content of $Ca^{2+}$ is limited to 0 to 20%, the content of $Sr^{2+}$ is limited to 0 to 20% and the content of $Ba^{2+}$ is limited to 0 to 40%.

Alkali metals such as $Li^+$, $Na^+$ and $K^+$ are components that decrease the glass viscosity and the glass transition temperature to expedite the production of the glass. When they are introduced to excess, however, they degrade the glass stability. Therefore, preferably, the content of $Li^+$ is limited to 0 to 30%, the content of $Na^+$ is limited to 0 to 20%, and the content of $K^+$ is limited to 0 to 20%. Of the alkali metals, $Li^+$ also has a high effect on improvement of the stability. Therefore, it is more preferred to introduce 0.5% or more of $Li^+$, it is still more preferred to introduce 1% or more of $Li^+$, and it is particularly preferred to introduce 2% or more of $Li^+$.

Rare earth elements such as $Y^{3+}$, $La^{3+}$, $Gd^{3+}$, $Yb^{3+}$, etc., are components that increase the refractive index while maintaining the low-dispersion property of the glass. In a glass having a small fluorine content, however, they are also components that greatly increase the melting temperature and the liquidus temperature. It is therefore preferred to limit the content of each of the above components to 0 to 5% exclusive of 5%. Further, it is preferred to limit the total content of the above rare earth elements to less than 5%, it is more preferred to limit the above total content to 4% or less, and it is still more preferred to limit the above total content to 3% or less.

$B^{3+}$ is a component that improves the durability of the glass. Since, however, it tends to volatilize as a fluoride during melting, it is also a component that decreases productivity. Therefore, it is preferred to limit the content of $B^{3+}$ to 0 to 10%, and it is more preferred to limit the content thereof to 0 to 5%. It is still more preferred to introduce no $B^{3+}$.

$Zn^{2+}$ and $In^{3+}$ have the property that they can be easily introduced to the glass like alkaline earth metals, and when $Zn^{2+}$ and $In^{3+}$ are introduced to form a multi-component glass, it is expected that there is produced an effect that the stability is improved. However, it is undesirable to introduce them to excess. Therefore, it is preferred to limit the content of each of $Zn^{2+}$ and $In^{3+}$ to 0 to 20%, it is more preferred to limit the content of each of $Zn^{2+}$ and $In^{3+}$ to 0 to 10%, and it is still more preferred to limit the content of each of $Zn^{2+}$ and $In^{3+}$ to 0 to 5%. It is particularly preferred to introduce none of $Zn^{2+}$ and $In^{3+}$.

In addition to the low-dispersion property and anomalous partial dispersion property, the optical glass III also has the property of exhibiting a high light transmittance in a broad region from short-wavelengths to long-wavelengths in the visible light region. When these properties are to be utilized, the optical glass III is suitable as a material for obtaining various optical elements such as a lens, a prism and the like. For the above use fields, it is preferred not to add ions having absorption in the visible light region, e.g., ions of metal elements such as Fe, Cu, Ni, Co, Cr, Mn, V, Nd, Ho and Er.

On the other hand, the optical glass III can be imparted with the property of near infrared absorption by adding $Cu^{2+}$. It is hence desirable to add 0.5 to 13% of $Cu^{2+}$ per 100% of the glass composition excluding $Cu^{2+}$. The glass containing $Cu^{2+}$ is suitable as a material for color collection filters for semiconductor image sensing devices such as CCD, CMOS, etc. The amount of $Cu^{2+}$ can be property determined in the above range while taking account of the thickness of the above filters. In the glass containing $Cu^{2+}$, it is desirable not to add any other ion having absorption in the visible light region than $Cu^{2+}$ unless the absorption characteristic is to be adjusted.

Anion components and anion additives will be explained below. The optical glass III is a fluorophosphate glass, and $F^-$ and $O^{2-}$ are essential anion components. Concerning the $F^-$ and $O^{2-}$ amount ratio, preferably, the $F^-/(F^-+O^{2-})$ is preferably over 0.2 as already described.

Further, when $Cl^-$, $Br^-$ and $I^-$ are introduced in a small amount, the fluorophosphate glass is not easily wetted on platinum products such as a platinum vessel, a nozzle made of platinum, etc., which are used when the glass is produced or when the glass is caused to flow out. Therefore, the glass can be easily produced. When $Cl^-$, $Br^-$ and $I^-$ are introduced to excess, they cause the variation of the refractive index because of the volatilization of a component and the occurrence of platinum foreign matter. Therefore, it is preferred to limit the total content of them to 0 to 3%, and it is more preferred to limit the above total content to 0.1 to 3%.

For achieving the object of the present invention, it is preferred to adjust the total content of $F^-$, $O^{2-}$, $Cl^-$, $Br^-$ and $I^-$ to 98 anionic % or more, it is more preferred to adjust the above total content to 99 anionic % or more, and it is still more preferred to adjust the above total content to 100 anionic %.

(Optical Glass IV)

The optical glass IV of the present invention will be explained below.

The optical glass IV is an optical glass formed of a fluorophosphate glass comprising $P^{5+}$ as a cationic component and $F^-$ and $O^{2-}$ as anionic components, the fluorophosphate glass having an $F^-$ content of 65 anionic % or more and an $O^{2-}$ content/$P^{5+}$ content molar ratio, $O^{2-}/F^-$, of 3.5 or more.

In the optical glass IV, the content of $F^-$ is adjusted to 65 anionic % or more for materializing the property of ultra-low dispersion. When the content of $F^-$ is less than 65 anionic %, it is difficult to obtain the desired low-dispersion property and anomalous dispersion property. When the content of $F^-$ is adjusted to 65 anionic % or more, the glass can be also imparted with a full anomalous dispersion property. The content of $F^-$ is preferably in the range of 65 to 95 anionic %, more preferably in the range of 80 to 95 anionic %.

Among fluorophosphate glasses, a fluorophosphate glass having a large $F^-$ content like the optical glass IV has a very low viscosity in its glass melt state, and in particular, the occurrence of striae and the variation of a refractive index because of the volatilization are intense.

In the optical glass IV, the generation of a volatile substance per se is suppressed by limiting the $O^{2-}/P^{5+}$ molar ratio to 3.5 or more, so that the volatility of the glass is remarkably decreased. Further, the reactivity and corrosiveness of the glass are also suppressed. There can be therefore produced a high-quality optical glass.

The optical glass IV will be explained with regard to its preferred compositional ranges. The optical glass IV is preferably a fluorophosphate glass comprising, by cationic %, 3 to 15% of $P^{5+}$,
25 to 40% of $Al^{2+}$,
5 to 35% of $Ca^{2+}$, and
5 to 25% of $Sr^{2+}$.

The above glass may further comprise, by cationic %, 0 to 10% of $Mg^{2+}$,
0 to 20% of $Ba^{2+}$,
0 to 20% of $Li^+$,
0 to 10% of $Na^+$,
0 to 10% of $K^+$, and
0 to 5% of $Y^{3+}$.

In descriptions hereinafter, "%" for a content of a cationic component or a total content of cationic components stands for "cationic %", and "%" for a content of an anionic component or a total content of anionic components stands for "anionic %", unless otherwise specified.

In the above glass, $P^{5+}$ works as a network former. When the content of $P^{5+}$ is less than 3%, the glass stability is degraded. When the content thereof exceeds 15%, it is required for adjusting the $O^{2-}/P^{5+}$ molar ratio to 3.5 or more to increase the content of $O^{2-}$. As a result, the content of $F^-$ is decreased, and it is difficult to obtain the full low-dispersion property and anomalous dispersion property. The content of $P^{5+}$ is therefore preferably limited to 3 to 15%. The content of $P^{5+}$ is more preferably in the range of 3.5 to 13%, still more preferably in the range of 4 to 11%.

$Al^{3+}$ is a component that works to increase the glass stability. When the content of $Al^{3+}$ is less than 25%, the glass is destabilized. When the content thereof exceeds 40%, the glass is destabilized. The content of $Al^{3+}$ is therefore preferably limited to 25 to 40%. The content of $Al^{3+}$ is preferably in the range of 28 to 33%, more preferably in the range of 30 to 36%.

$Ca^{2+}$ has an effect on improvement of the glass stability, and it is a component of which the content is desirably increased with an increase in the content of $F^-$. When the content of $Ca^{2+}$ is less than 5%, it is difficult to produce the above effect sufficiently. When it exceeds 35%, the stability is degraded. The content of $Ca^{2+}$ is therefore preferably limited to 5 to 35%. The content of $Ca^{2+}$ is more preferably in the range of 10 to 35%, still more preferably in the range of 20 to 30%.

$Sr^{2+}$ has an effect on improvement of the glass stability. When the content thereof is less than 5%, the above effect is insufficient, and when it exceeds 25%, the stability is degraded. The content of $Sr^{2+}$ is therefore preferably limited to 5 to 25%. The content of $Sr^{2+}$ is more preferably in the range of 10 to 25%, still more preferably in the range of 15 to 20%.

When $Ca^{2+}$ and $Sr^{2+}$ are allowed to be co-present as described above, the glass is more improved in stability.

When $Mg^{2+}$ is introduced up to 10%, it works to improve the glass stability. It is hence preferred to limit the content of $Mg^{2+}$ to 0 to 10%, it is more preferred to limit the above content to 1 to 10%, and it is still more preferred to limit the above content to 3 to 8%.

When $Ba^{2+}$ is introduced up to 20%, it works to improve the glass stability. It is hence preferred to limit the content of $Ba^{2+}$ to 0 to 20%. In a glass having a small content of $F^-$, $Ba^{2+}$ well works to improve the stability. However, it is not an essential component for a glass having a large content of $F^-$. The content of $Ba^{2+}$ is preferably in the range of 1 to 15%, more preferably in the range of 2 to 10%.

For further improving the glass in stability, it is preferred to allow $Ca^{2+}$, $Sr^{2+}$ and $Mg^{2+}$ to be co-present, to allow $Ca^{2+}$, $Sr^{2+}$ and $Ba^{2+}$ to be co-present or to allow $Ca^{2+}$, $Sr^{2+}$, $Mg^{2+}$ and $Ba^{2+}$ to be co-present.

$Li^+$ decreases the viscosity of a glass melt. However, it works very strongly to decrease the liquidus temperature. As a whole, it is a component that has an effect on the prevention of striae when a molten glass is caused to flow out and shaped. This effect greatly contributes to an improvement in the quality of the fluorophosphate glass with its synergistic effect with the effect of the volatile component generation suppression produced by bringing the $O^{2-}/P^{5+}$ molar ratio into the predetermined range. When $Li^+$ is introduced in an amount of over 20%, it causes an excess decrease in the viscosity of a glass melt and causes problems such as the devitrification of the glass induced by the promotion of devitrification and the occurrence of striae. The content of $Li^+$ is therefore preferably limited to 0 to 20%. The content of $Li^+$ is preferably in the range of 0 to 15%, more preferably in the range of 1 to 10%, still more preferably in the range of 1 to 7%.

$Na^+$ works to decrease the glass transition temperature. However, when it is introduced to excess, the glass is degraded in stability, and it is also degraded in water resistance. The content of $Na^+$ is therefore preferably limited to 0 to 10%. The content of $Na^+$ is preferably in the range of 0 to 7%, more preferably in the range of 1 to 5%.

$K^+$ works to decrease the glass transition temperature as well. However, when it is introduced to excess, the glass is degraded in stability, and it is also degraded in water resistance. The content of $K^+$ is therefore preferably limited to 0 to 10%. The content of $K^+$ is preferably in the range of 0 to 5%, more preferably in the range of 1 to 3%.

When a plurality of members of $Li^+$, $Na^+$ and $K^+$ as alkali metal components are allowed to be co-present, the glass can be improved in stability.

When $Y^{3+}$ is introduced in a small amount, it is expected that the glass stability is improved. When the content thereof exceeds 5%, the melting temperature of the glass is increased, and the volatilization from a molten glass is promoted. The glass is also degraded in stability. The content of $Y^{3+}$ is therefore preferably limited to 0 to 5%. The content of $Y^{3+}$ is preferably in the range of 0 to 5%, more preferably in the range of 1 to 3%.

In addition thereto, $La^{3+}$, $Gd^{3+}$, $Zr^{4+}$ and $Zn^{2+}$ may be introduced in a small amount for adjusting the refractive index.

For obtaining a fluorophosphate glass having excellent molten glass moldability and a high quality, it is preferred to adjust the total content of $P^{5+}$, $Al^{3+}$, $Li^+$, $Mg^{2+}$, $Ca^{2+}$, $Sr^{2+}$, $Ba^{2+}$, $Na^+$, $K^+$ and $Y^+$ to 95% or more, it is more preferred to adjust the above total content to 97% or more, it is still more preferred to adjust the above total content to 98% or more, and it is yet more preferred to adjust the above total content to 99% or more.

The glass transition temperature of the optical glass IV is preferably lower than 500° C., more preferably 480° C. or lower, still more preferably 460° C. or lower, yet more preferably 440° C. or lower. Since having the above low glass transition temperature, the optical glass IV is suitable for being precision press-molded, and further, it is excellent in moldability when it is re-heated and softened. Since the optical glass IV has the above low glass transition temperature, the temperature for heating it for molding can be maintained at a relatively low temperature. Therefore, a reaction between the glass and a mold such as a press mold does not easily take place, so that glass shaped materials having clean and smooth surfaces can be formed. Further, the deterioration of the mold can be also suppressed.

The Abbe's number ($v_d$) of the optical glass IV is preferably 85 or more, more preferably in the range of 88 to 100, still more preferably 90 to 97.

The refractive index ($n_d$) thereof is preferably in the range of 1.428 to 1.5, more preferably in the range of 1.43 to 1.48.

The optical glass IV has the property of ultra-low dispersion and at the same time has excellent glass stability represented by a liquidus temperature of 700° C. or lower. There can be therefore provided a high-quality fluorophosphate glass as an optical element material suitable for color correction.

In the optical glasses I to IV, it is desirable for decreasing environmental burdens to introduce none of Pb, As, Cd, Th, etc. Similarly, it is desirable for decreasing environmental burdens to introduce none of Tl, Te, Cr, Se and U.

The optical glass of the present invention does not require components like Lu, Sc, Hf and Ge. Since Lu, Sc, Hf and Ge are expensive, it is preferred to introduce none of these components.

The optical glass of the present invention exhibits excellent light transmittance in a broad wavelength region of the visible light region. When the optical glass of the present invention is not required to have absorption in a specific wavelength region while utilizing the above property, it is preferred to introduce none of substances that cause coloring such as Cu, Cr, V, Fe, Ni, Co, Nd, and the like.

[Process for the Production of Optical Glass]

The process for the production of an optical glass, provided by the present invention, will be explained below.

The process for the production of an optical glass, provided by the present invention, includes the following three embodiments, i.e., glass production processes I to III.

The first embodiment (to be referred to as "glass production process I" hereinafter) of the process for the production of an optical glass formed of a fluorophosphate glass, provided by the present invention, comprises using, as raw materials or cullet, a glass composition having an a total $O^{2-}$ content/total $P^{5+}$ content molar ratio, $O^{2-}/P^{5+}$, of 3.5 or more when the optical glass is produced by melting the raw materials or cullet and refining and homogenizing a molten glass, and thereby producing the optical glass of the present invention.

That is, the glass production process I is a process for the production of the optical glass of the present invention, in which a glass composition having an a total $O^{2-}$ content/total $P^{5+}$ content molar ratio, $O^{2-}/P^{5+}$, of 3.5 or more is used as raw materials or cullet when the optical glass is obtained by melting the raw materials or cullet and then refining and homogenizing the molten glass.

The second embodiment (to be referred to as "glass production process II" hereinafter) of the process for the production of an optical glass, provided by the present invention, is a process for the production of an optical glass formed of a fluorophosphate glass, which comprises preparing a raw material batch from raw materials or cullet, melting the raw material batch and then carrying out refining and homogenization, the process comprising preparing the raw material batch in which the total $O^{2-}$ content/total $P^{5+}$ content molar ratio, $O^{2-}/P^{5+}$, is 3.5 or more and carrying out the melting, refining and homogenization to produce a fluorophosphate glass having an Abbe's number ($v_d$) of over 70.

In a glass having an $O^{2-}$ content/$P^{5+}$ content molar ratio, $O^{2-}/P^{5+}$, of less than 3.5, a volatile substance is generated during the melting of the glass and a glass component volatilizes during the production of the glass as already described. Therefore, in the glass production process I, a glass composition having an a total $O^{2-}$ content/total $P^{5+}$ content molar ratio, $O^{2-}/P^{5+}$, of 3.5 or more is used as raw materials or cullet, and in the glass production process II, there is prepared a raw material batch in which the total $O^{2-}$ content/total $P^{5+}$ content molar ratio, $O^{2-}/P^{5+}$, is 3.5 or more, whereby the generation of a volatile substance is suppressed during the melting of each glass and the volatilization of a component is suppressed during the production of each glass.

For bringing the total $O^{2-}$ content/total $P^{5+}$ content molar ratio, $O^{2-}/P^{5+}$, in the glass raw materials or cullet into 3.5 or more, it is preferred to use, as one of glass raw materials, a diphosphate in which the ratio of number of oxygen ($O^{2-}$) atoms per atom of phosphorus ($P^{5+}$) (oxygen atom/phosphorus atom) is 3.5 or to use a cullet prepared from glass raw materials including the diphosphate.

In the glass production processes I and II, for example, glass raw materials such as phosphate, fluoride, etc., which are properly weighed and mixed so as to give a desired composition having a total $O^{2-}$ content/total $P^{5+}$ content molar ratio, $O^{2-}/P^{5+}$, of 3.5 or more, are fed to a melting vessel made of platinum alloy, heated and melted, and a molten glass is refined, homogenized and then caused to flow out of a pipe, followed by shaping, whereby an optical glass having desired properties can be obtained.

The third embodiment (to be referred to as "glass production process III" hereinafter) of the process for the production of an optical glass, provided by the present invention, is a process for the production of an optical glass formed of a fluorophosphate glass, which comprises preparing a raw material batch from raw materials or cullet, melting the raw material batch, then carrying out refining and homogenization to prepare a molten glass and shaping said molten glass, the process comprising controlling the total $O^{2-}$ content/total $P^{5+}$ content molar ratio, $O^{2-}/P^{5+}$, in said raw material batch for decreasing the volatility of said molten glass.

In the glass production process III, on the basis of a novel finding that the $O^{2-}/P^{5+}$ molar ratio has a great effect on the volatility of a molten glass, the total $O^{2-}$ content/total $P^{5+}$ content molar ratio, $O^{2-}/P^{5+}$, is controlled so that the volatility of a molten glass is decreased, to produce an optical glass.

That is, the above molar ratio is so controlled that the refractive index ($n_d$) and Abbe's number ($v_d$) come to be desired values and that the volatility of a molten glass is decreased. The above molar ratio is adjusted such that it is 3.5 or more. The above molar ratio is preferably in the above-described range.

In the glass production processes I to III, the procedures of heating and melting the glass raw materials or cullet are preferably carried out in the atmosphere of an inert gas such as nitrogen gas or the like. As a melting apparatus for melting the glass, a known melting apparatus for fluorophosphate glass can be used.

Like the glass production process I, the glass production processes II and III are suitable for producing a fluorophosphate glass having an Abbe's number ($v_d$) of over 70, a fluorophosphate glass having an Abbe's number ($v_d$) of over 78, a fluorophosphate glass in which the total content of rare earth elements is less than 5 cationic % and the $F^-$ content/$F^-$ and $O^{2-}$ total content molar ratio, $F^-/(F^-+O^{2-})$, is over 0.2 and which has a refractive index ($n_d$) of over 1.53 and a fluorophosphate glass having an $F^-$ content of 65 anionic % or more.

[Press-Molding Preform and Process for the Production Thereof]

The press-molding preform of the present invention will be explained below.

The press-molding preform of the present invention is characteristically formed of the optical glass of the present invention or an optical glass obtained by the process for the production of an optical glass, provided by the present invention.

The press-molding preform as used herein means a material obtained by pre-shaping a glass having a weight equivalent to the weight of a press-molded article to a form suitable for press-molding.

The press-molding preform of the present invention is in particular suitable for precision press-molding, and when it is used a precision press-molding preform, it is preferred to form a mold release film such as a carbon film, or the like on the entire surface of the preform.

The process for the production of a press-molding preform, provided by the present invention, will be explained below.

The process for the production of a press-molding preform, provided by the present invention, includes two embodiments.

The first embodiment (to be referred to as "preform production process I" hereinafter) of the process for the production of a preform, provided by the present invention, is a process for the production of a press-molding preform which comprises causing a molten glass to flow out of a pipe to separate a molten glass gob having a predetermined weight and shaping said glass gob into a preform when the glass goes through a process of cooling, the process comprising shaping the press-molding preform of the present invention.

That is, the preform production process I is a process for the production of the press-molding preform of the present invention, and it is a process comprising causing a molten glass to flow out of a pipe to separate a molten glass gob having a predetermined weight and shaping this glass gob into a preform when the glass goes through a process of cooling.

In the preform production process I, first, a molten glass is caused to flow out of a pipe. For example, a molten glass is caused to flow, continuously at a constant rate, out of a pipe made of a platinum alloy or platinum which pipe is heated to a predetermined temperature by a heating method such as an electric heating method, a high-frequency induction heating method or a combination of these methods.

Then, a molten glass gob having the weight of one preform or the weight obtained by adding a removal amount to be described later to the weight of one preform is separated from the molten glass that is flowing out. For separating the molten glass gob, desirably, no cutting blade is used so as not to leave a cutting mark. For example, it is preferred to employ a method in which the molten glass is caused to fall as drops from the flow outlet of the pipe or a method in which the forward end of the molten glass that is flowing out is supported with a support and the support is rapidly moved downward at a time when the molten glass gob having the intended weight is separable, to separate the molten glass gob from the forward end portion of the flowing molten glass by utilizing the surface tension of the molten glass.

The thus-separated molten glass gob is shaped on/above the concave portion of a preform shaping mold into a preform having a desired form when the glass goes through a process of cooling. In the case, preferably, the shaping is carried out in a state in which the glass is caused to float above the concave portion by applying an upward gas pressure to the glass gob, for preventing the formation of wrinkles on the preform surface of the breaking called cracking during the process of glass cooling.

After the glass is cooled to a temperature at which the preform is not deformable even by application of an external force, the preform is taken out of the shaping mold and gradually cooled.

The thus-obtained preform is originally formed of the glass that does not easily cause striae as described above. However, when striae are slightly formed on the preform surface, the striae are present locally in a preform surface layer, so that an optically highly uniform preform free of striae can be completed by removing the above surface layer by an etching or polishing process.

When any one of the etching process and the polishing process is employed, desirably, the molten glass gob having the weight obtained by adding a removal amount to the intended preform weight is separated such that the glass gob comes to have the intended weight after the surface layer is removed.

The preform production process I is in particular suitable as a process for the production of precision press-molding preforms.

The second embodiment (to be referred to as "preform production process II" hereinafter) of the process for the production of a preform, provided by the present invention, is a process for the production of a press-molding preform, which comprises casting a molten glass into a casting mold to prepare a glass shaped material and processing said glass shaped material to make the press-molding preform, the process comprising shaping the press-molding preform of the present invention.

The above casting mold can be selected from known ones as required depending upon a shaping form. For example, a casting mold having a flat bottom surface, three side walls surrounding the bottom surface on three sides of the bottom and one open side is arranged below the pipe that allows a molten glass to flow out, in a manner that the bottom surface is horizontal. And, the molten glass flowing continuously out of the pipe is cast on the bottom surface of the casting mold and shaped in a plate form while the glass is filled in a portion surrounded with the side walls. A shaped glass is withdrawn from the above opening portion at a constant speed in the horizontal direction, to obtain a glass plate having a constant width and a constant thickness. The thus-withdrawn glass plat is annealed while it slowly passes through an annealing furnace. The annealed glass plate is cut at right angles with the drawing direction, to obtain a glass plate having a desired length.

There may be employed a constitution in which a casting mold having a through hole is arranged below the pipe that allows a molten glass to flow out, in a manner that the through hole extends vertically, and the molten glass is caused to continuously flow into the through hole. The glass that is caused to flow into the through hole is rapidly cooled and shaped in a rod form, and the shaped glass is withdrawn in the downward direction at a constant speed from the lower end opening portion of the through hole. The glass rod withdrawn from the casting mold passes through an atmosphere that is heated to a temperature around the glass transition temperature thereof, and after the glass rod is subjected to procedures that bring the surface temperature and inside temperature of the glass rod close to each other, it was cut in the horizontal direction, to give a glass rod having a desired length.

The thus-obtained glass shaped material in the form of a plate or a rod is divided into glass pieces by cutting or splitting, and each glass piece is mass-adjusted by barrel polishing so as to have a mass having the weight of one optical element blank, whereby a press-molding preform is obtained. By the barrel polishing, edges of the glass piece can be rounded and the edges that may cause a breaking or a folding during press molding can be removed. Further, the preform is surface-roughened so that a mold release agent in the form of a powder easily adheres to the surface during its press molding. Differing from a precision press-molded article, the thus-obtained preform is a glass material which is press-molded to produce an optical element blank which is thereafter surface-ground and polished to produce an optical element having an optical function surface.

Another example is a method in which the above glass piece is ground and polished so that the glass surface is smoothened to form a precision press-molding preform, and a still another example is a method in which the above barrel-polished product is surface-smoothened by polishing to form a precision press-molding preform.

[Optical Element Blank and Process for the Production Thereof]

The optical element blank of the present invention will be explained below.

The optical element blank of the present invention is characteristically formed of the optical glass of the present invention or an optical glass obtained by the process of the present invention.

The optical element blank is a glass shaped product from which an optical element is completed by cutting and grinding as described above, and it has the form obtained by acing a process margin to be removed by cutting and grinding to the form of an intended optical element, that is, a form similar to the form of an optical element.

The process for the production of an optical element blank, provided by the present invention, will be explained below.

The process for the production of an optical element, provided by the present invention, includes two embodiments.

The first embodiment (to be referred to as "optical element blank production method I" hereinafter) is a process for the production of an optical element blank from which an optical element is completed by cutting and grinding, the process comprising heating and press-molding the preform of the present invention or a preform obtained by the process of the present invention.

In this process, the heating is preceded by uniformly applying a mold release agent in the form of a powder such as boron nitride to the preform surface and placing the preform on a refractory plate and introducing the refractory plate with the preform on it into a heating-softening furnace, and the preform is heated until the glass is softened. The preform is introduced into a press mold and pressed. Then, the resultant press-molded product is taken out of the mold and annealed to remove a strain and to adjust optical properties in order to ensure that optical properties such as a refractive index come to be desired values. In this manner, an optical element blank can be produced.

The second embodiment (to be referred to as "optical element blank production method II" hereinafter) of the process for the production of an optical element, provided by the present invention, is a process for the production of an optical element blank which comprises melting glass raw materials, causing the resultant molten glass to flow out, separating a molten glass gob from a molten glass flow and press-molding the molten glass gob, the process comprising melting and molding the optical glass of the present invention or an optical glass obtained by the process of the present invention.

In this process, a homogenized molten glass is caused to flow out on the molding surface of a lower mold member to which a mold release agent in the form of a powder such as boron nitride is applied, and the molten glass flow having its lower end portion supported on the lower mold member is cut off with a cutting blade called shears. In this manner, the molten glass gob having a desired mass is obtained on the molding surface of the lower mold member. Then, the lower mold member with the molten glass gob on it is transferred right below an upper mold member standing in a different position, and the molten glass gob is pressed with the upper and lower mold members to form an optical element blank. The resultant press-molded product is taken out of the mold and annealed to remove a strain and to adjust optical properties in order to ensure that optical properties such as a refractive index come to be desired values. In this manner, an optical element blank can be produced.

Both the optical element production processes I and II can be carried out in atmosphere. The molding conditions, the material of the press mold, the heating-softening furnace and the refractory plate used for the heating and softening, etc., can be selected from known conditions or those which are known.

According to the present invention, there can be provided an optical element blank from which an optical element free of defects such as striae, etc., can be produced, and a process for the production thereof.

[Optical Element and Process for the Production Thereof]

The optical element of the present invention will be explained below.

The optical element of the present invention is characteristically formed of the optical glass of the present invention or an optical glass obtained by the process of the present invention.

The optical element of the present invention is formed of the above optical glass of the present invention or an optical glass obtained by the above process of the present invention, there can be provided optical elements utilizing the low dispersion property.

While the optical element is not specially limited with regard to its kind and form, examples thereof include an aspherical lens, a spherical lens, a micro-lens, a lens array, a prism, a diffraction grating, a prism with a lens, a lens with a diffraction grating, etc. Examples of the aspherical lens and spherical lens include a convex meniscus lens, a concave meniscus lens, a biconvex lens, biconcave lens, a plano-convex lens, a plano-concave lens, etc.

In view of use fields, examples of the optical element include a lens for a digital camera, a lens for a cellphone with a built-in camera, an optical pickup lens, a collimator lens, a lens for optical communications, etc.

The surface of the optical element may be provided with an optical thin film such as an anti-reflection film, or the like.

The process for the production of an optical element, provided by the present invention, will be explained below.

The process for the production of an optical element, provided by the present invention, includes two embodiments.

The first embodiment (to be referred to as "optical element production process I" hereinafter) is a process for the production of an optical element, which comprises cutting and grinding the optical element blank of the present invention or an optical element blank produced by the process of the present invention.

For the above cutting and grinding, known methods can be employed. The optical element production process I is suitable for producing optical elements easily produced by cutting and grinding and a large-diameter lens such as the most object side lens of telescopic lenses.

The second embodiment (to be referred to as "optical element production process II" hereinafter) of the process for the production of an optical element, provided by the present invention, comprises heating and precision press-molding the preform of the present invention or a preform obtained by the process of the present invention. That is, the optical element production method II is a process for the production of the optical element of the present invention, which comprises heating and precision press-molding the preform of the present invention or a preform obtained by the process of the present invention.

The above precision press-molding is called "optics molding" as well and is well known in the field of this art. In the optical element, a surface which transmits, refracts, diffracts or reflects light is referred to as an optical function surface (for example, the aspherical surface of an aspherical lens, the spherical surface of a spherical lens, etc., correspond to the optical function surface). According to precision press-molding, the form of the molding surface of a press mold is precisely transferred to a glass, whereby the optical function surface can be formed by press-molding, and machine procedures such as cutting and grinding are not required for completing the optical function surface.

The process for the production of an optical element, provided by the present invention, is therefore suitable for the production of optical elements such as a lens, a lens array, a diffraction grating, a prism, etc., and in particular suitable as a process for highly productively producing aspherical lenses.

The press mold for the precision press-molding can be selected from known press molds, such as press molds obtained by forming a mold release film on the molding surface of a mold material made of refractory ceramic such as silicon carbide, zirconia, alumina, or the like. Of these, a press mold made of silicon carbide is preferred, and a carbon-containing film can be used as a mold release film. In view of durability and a cost, a carbon film is particularly preferred.

In the precision press-molding, desirably, a non-oxidizing gas atmosphere is employed as an atmosphere during molding for maintaining the molding surface of the press mold under excellent conditions. The non-oxidizing gas is preferably selected from nitrogen, a mixture gas of nitrogen and hydrogen, or the like.

The precision press-molding for use in the process for the production of an optical element, provided by the present invention, includes the following two embodiments of precision press-molding I and precision press-molding II.

(Precision Press-Molding I)

The precision press-molding I is a method in which a preform is introduced into a press mold and the press mold and the preform are heated together to carry out the precision press-molding.

In the precision press-molding I, preferably, the press mold and the above preform are heated to a temperature at which the glass constituting the preform exhibits a viscosity of $10^6$ to $10^{12}$ dPa·s to carry out the precision press-molding.

Further, desirably, a precision press-molded product is cooled to a temperature at which the above glass preferably exhibits a viscosity of $10^{12}$ dPa·s or more, more preferably $10^{14}$ dPa·s or more, still more preferably $10^{16}$ dPa·s or more before it is taken out of the press mold.

Under the above conditions, not only the form of the molding surface of the press mold can be precisely transferred to the glass, but also the precision press-molded product can be taken out without any deformation.

(Precision Press-Molding II)

The precision press-molding II is a method in which a preform heated is introduced to a pre-heated press mold to carry out the precision press-molding.

According to this precision press-molding II, preforms are pre-heated before they are introduced into a press mold, so that optical elements that are free of surface defects and that have excellent surface accuracy can be produced in an optical element production cycle that is shortened.

The temperature for pre-heating the press mold is preferably set at a temperature lower than the temperature for pre-heating the preform. When the temperature for pre-heating the press mold is so decreased, the abrasion of the press mold can be decreased.

In the precision press-molding II, the above preform is preferably pre-heated to a temperature at which the glass constituting the preform exhibits a viscosity of $10^9$ dPa·s or less, more preferably, $10^9$ dPa·s.

Further, preferably, the above preform is pre-heated while it is caused to float. Further, the above preform is more preferably pre-heated to a temperature at which the glass constituting the preform exhibits a viscosity of $10^{5.5}$ to $10^9$ dPa·s, and it is still more preferably pre-heated to a temperature at which the glass constituting the preform exhibits a viscosity of $10^{5.5}$ or more but less than $10^9$ dPa·s.

Preferably, the cooling of the glass is started upon the start of pressing or during the pressing.

In addition, the press mold is temperature-adjusted to a temperature lower than the pre-heating temperature for the preform, while the temperature adjustment can be made using, as a target, a temperature at which the above glass exhibits a viscosity of $10^9$ to $10^{12}$ dPa·s.

In the above process, preferably, a press-molded product is taken out of the mold after it is cooled to a temperature at which the above glass exhibits a viscosity of $10^{12}$ dPa·s or more.

The optical element obtained by the precision press-molding is taken out of the press mold and cooled as required. When the molded product is an optical element such as a lens or the like, an optical thin film may be coated on the surface thereof as required.

EXAMPLES

The present invention will be more specifically explained with reference to Examples hereinafter, while the present invention shall not be limited by these Examples.

Example 1 and Comparative Example 1

Production Examples of Optical Glasses

For producing optical glasses Nos. 1 to 38 having compositions shown in Tables 1-1 to 1-8 and optical glasses Nos. 1 and 2 having compositions shown in Table 1-2, phosphates such as diphosphate, etc., and raw materials such as fluoride, corresponding to components of each glass, were weighed and fully mixed. Tables 1-1 to 1-8 also show a ratio of a total content of $O^{2-}$ to a total content of $P^{5+}$ ($O^{2-}/P^{5+}$), a content ratio of rare earth meals (cationic %) and a ratio of the content of $F^-$ to the total content of $F^-$ and $O^{2-}$ ($F^-/(F^-+O^{2-})$) in each of raw material batches. The above raw material batch was charged into a platinum crucible and melted under heat in an electric furnace at 900° C. with stirring over the time period of 1 to 3 hours, and a molten glass was refined and homogenized. In this manner, the optical glasses Nos. 1 to 38 and comparative optical glasses Nos. 1 and 2 were obtained. In Tables 1-1 to 1-8, the optical glasses Nos. 1 to 4 correspond to the optical glasses I and II of the present invention, the optical glasses Nos. 5 to 9 correspond to the optical glasses I and III of the present invention, and the optical glasses Nos. 10 to 38 correspond to the optical glass IV of the present invention.

In the optical glasses Nos. 1 to 38, the ratio of the total content of $O^{2-}$ to the total content of $P^{5+}$ ($O^{2-}/P^{5+}$) each was controlled so that it was 3.5 or more as shown in Tables 1-1 to 1-8, and the contents of the other components were balanced, whereby there were obtained optical glasses whose volatility was greatly decreased and which had desired properties. While the above Production Examples used non-vitrified raw materials including phosphates such as diphosphate, etc., and fluorides, cullet may be used or non-vitrified raw materials and cullet may be used in combination.

With regard to each of the above optical glasses and comparative optical glasses, 200 g of a sample obtained by melting raw materials for 1 hour were measured for a refractive index ($n_d$) (1 h) and an Abbe's number ($v_d$) (1 h), and 200 g of a sample obtained by melting raw materials for 3 hours was measured for a refractive index ($n_d$) (3 h) and an Abbe's number ($v_d$) (3 h) and measured for a glass transition temperature. Tables 1-1 and 1-8 show the results.

The refractive indices ($n_d$), Abbe's numbers ($v_d$) and glass transition temperatures ($T_g$) of the above optical glasses were measured by the following methods.

(1) Refractive Index ($n_d$) and Abbe's Number ($v_d$)

An optical glass obtained by adjusting a gradual cooling rate at −30° C./hour was measured.

(2) Glass Transition Temperature ($T_g$)

Measurement was made with an apparatus for thermomechanical analysis supplied by Rigaku Corporation (Thermoplus TMA 8310) by setting a temperature elevation rate at 4° C./minute.

TABLE 1-1

| | Optical glass | | | | |
|---|---|---|---|---|---|
| | 1 | 2 | 3 | 4 | 5 |
| Cationic components (cationic %) | | | | | |
| $P^{5+}$ | 19.0 | 20.3 | 20.0 | 19.7 | 32.6 |
| $Al^{3+}$ | 22.7 | 22.3 | 22.4 | 22.5 | 11.6 |
| $Mg^{2+}$ | 6.8 | 6.7 | 6.7 | 6.8 | 6.3 |
| $Ca^{2+}$ | 8.5 | 8.4 | 8.4 | 8.5 | 6.3 |
| $Sr^{2+}$ | 14.5 | 14.3 | 14.3 | 14.4 | 5.3 |
| $Ba^{2+}$ | 10.1 | 10.0 | 10.0 | 10.0 | 16.9 |
| $Mg^{2+} + Ca^{2+} + Sr^{2+} + Ba^{2+}$ | 39.9 | 39.4 | 39.4 | 39.7 | 34.8 |
| $Li^+$ | 17.3 | 17.0 | 17.1 | 17.1 | 20.0 |
| $Na^+$ | 0.0 | 0.0 | 0.0 | 0.0 | 0.0 |
| $K^+$ | 0.0 | 0.0 | 0.0 | 0.0 | 0.0 |
| $Y^{3+}$ | 1.1 | 1.0 | 1.1 | 1.0 | 1.0 |
| $La^{3+}$ | 0.0 | 0.0 | 0.0 | 0.0 | 0.0 |
| $Gd^{3+}$ | 0.0 | 0.0 | 0.0 | 0.0 | 0.0 |
| $Yb^{3+}$ | 0.0 | 0.0 | 0.0 | 0.0 | 0.0 |
| $Y^{3+} + La^{3+} + Gd^{3+} + Yb^{3+}$ | 1.1 | 1.0 | 1.1 | 1.0 | 1.0 |
| $B^{3+}$ | 0.0 | 0.0 | 0.0 | 0.0 | 0.0 |
| $Zn^{2+}$ | 0.0 | 0.0 | 0.0 | 0.0 | 0.0 |
| $In^{3+}$ | 0.0 | 0.0 | 0.0 | 0.0 | 0.0 |
| Cation total | 100.0 | 100.0 | 100.0 | 100.0 | 100.0 |
| Anionic components | | | | | |
| $F^-$ (anionic %) | 62.9 | 62.0 | 61.8 | 61.7 | 35.1 |
| $O^{2-}$ (anionic %) | 37.1 | 38.0 | 38.2 | 38.3 | 64.9 |
| $F^-/(F^- + O^{2-})$ | 0.629 | 0.620 | 0.618 | 0.617 | 0.351 |
| $O^{2-}/P^{5+}$ | 3.74 | 3.61 | 3.67 | 3.72 | 3.50 |
| Refractive index ($n_d$) | | | | | |
| Nd (1 h) | 1.49582 | 1.49504 | 1.49649 | 1.49817 | 1.55042 |
| Nd (3 h) | 1.49630 | 1.49605 | 1.49733 | 1.49888 | 1.55147 |
| Nd (3 h) − Nd (1 h) | 0.00048 | 0.00101 | 0.00084 | 0.00071 | 0.00105 |
| Abbe's number ($v_d$) | | | | | |
| $v_d$ (1 h) | 82.0 | 81.7 | 81.4 | 81.3 | 71.9 |
| $v_d$ (3 h) | 81.9 | 81.6 | 81.3 | 81.3 | 71.9 |
| | −0.1 | −0.1 | −0.1 | 0.0 | 0.0 |
| Glass transition temperature (° C.) | | | | | 389 |

(Notes)
Nd (1 h) shows a refractive index ($n_d$) of a sample obtained by melting at 900° C. for 1 hour.
Nd (3 h) shows a refractive index ($n_d$) of a sample obtained by melting at 900° C. for 3 hours.
$v_d$ (1 h) shows an Abbe's number ($v_d$) of a sample obtained by melting at 900° C. for 1 hour.
$v_d$ (3 h) shows an Abbe's number ($v_d$) of a sample obtained by melting at 900° C. for 3 hours.

TABLE 1-2

| | Optical glass | | | | Comparative Optical Glass | |
|---|---|---|---|---|---|---|
| | 6 | 7 | 8 | 9 | 1 | 2 |
| Cationic components (cationic %) | | | | | | |
| $P^{5+}$ | 29.0 | 31.9 | 32.6 | 30.0 | 25.0 | 25.0 |
| $Al^{3+}$ | 9.0 | 11.7 | 11.6 | 12.0 | 21.0 | 21.0 |
| $Mg^{2+}$ | 6.0 | 6.4 | 6.3 | 6.6 | 6.3 | 6.3 |
| $Ca^{2+}$ | 4.0 | 6.4 | 6.3 | 6.6 | 7.9 | 7.9 |
| $Sr^{2+}$ | 5.0 | 5.3 | 5.3 | 5.5 | 13.4 | 13.4 |
| $Ba^{2+}$ | 25.0 | 17.0 | 16.9 | 17.5 | 9.4 | 9.4 |
| $Mg^{2+} + Ca^{2+} + Sr^{2+} + Ba^{2+}$ | 40.0 | 35.1 | 34.8 | 36.2 | 37.0 | 37.0 |
| $Li^+$ | 21.0 | 20.2 | 20.0 | 20.8 | 16.0 | 16.0 |
| $Na^+$ | 0.0 | 0.0 | 0.0 | 0.0 | 0.0 | 0.0 |
| $K^+$ | 0.0 | 0.0 | 0.0 | 0.0 | 0.0 | 0.0 |
| $Y^{3+}$ | 1 | 1.1 | 1.0 | 1.0 | 1.0 | 1.0 |
| $La^{3+}$ | 0.0 | 0.0 | 0.0 | 0.0 | 0.0 | 0.0 |
| $Gd^{3+}$ | 0.0 | 0.0 | 0.0 | 0.0 | 0.0 | 0.0 |

TABLE 1-2-continued

|  | Optical glass | | | | Comparative Optical Glass | |
|---|---|---|---|---|---|---|
|  | 6 | 7 | 8 | 9 | 1 | 2 |
| $Yb^{3+}$ | 0.0 | 0.0 | 0.0 | 0.0 | 0.0 | 0.0 |
| $Y^{3+} + La^{3+} + Gd^{3+} + Yb^{3+}$ | 1.0 | 1.1 | 1.0 | 1.0 | 1.0 | 1.0 |
| $B^{3+}$ | 0.0 | 0.0 | 0.0 | 0.0 | 0.0 | 0.0 |
| $Zn^{2+}$ | 0.0 | 0.0 | 0.0 | 0.0 | 0.0 | 0.0 |
| $In^{3+}$ | 0.0 | 0.0 | 0.0 | 0.0 | 0.0 | 0.0 |
| Cation total | 100.0 | 100.0 | 100.0 | 100.0 | 100.0 | 100.0 |
| Anionic components | | | | | | |
| $F^-$ (anionic %) | 41.3 | 34.6 | 35.1 | 39.4 | 63.4 | 58.4 |
| $O^{2-}$ (anionic %) | 58.7 | 65.4 | 64.9 | 60.6 | 36.6 | 41.6 |
| $F^-/(F^- + O^{2-})$ | 0.413 | 0.346 | 0.351 | 0.394 | 0.634 | 0.584 |
| $O^{2-}/P^{5+}$ | 3.51 | 3.56 | 3.50 | 3.54 | 3.00 | 3.29 |
| Refractive index ($n_d$) | | | | | | |
| Nd(1 h) | 1.54837 | 1.55226 | 1.54865 | 1.54445 | 1.48806 | 1.49574 |
| Nd(3 h) | 1.54910 | 1.55295 | 1.54979 | 1.54527 | 1.49288 | 1.50097 |
| Nd(3 h) − Nd(1 h) | 0.00073 | 0.00069 | 0.00114 | 0.00082 | 0.00482 | 0.00523 |
| Abbe's number ($v_d$) | | | | | | |
| $v_d$(1 h) | 71.8 | 71.7 | 72.0 | 72.6 | 82.4 | 80.9 |
| $v_d$(3 h) | 71.6 | 71.7 | 71.8 | 72.9 | 81.3 | 80.4 |
| $v_d$(3 h) − $v_d$(1 h) | −0.2 | 0.0 | −0.2 | 0.3 | −1.1 | −0.5 |
| Glass transition temperature (° C.) | 369 | 395 | 389 | 385 | 378 | |

(Notes)
Nd(1 h) shows a refractive index ($n_d$) of a sample obtained by melting at 900° C. for 1 hour.
Nd(3 h) shows a refractive index ($n_d$) of a sample obtained by melting at 900° C. for 3 hours.
$v_d$ (1 h) shows an Abbe's number ($v_d$) of a sample obtained by melting at 900° C. for 1 hour.
$v_d$ (3 h) shows an Abbe's number ($v_d$) of a sample obtained by melting at 900° C. for 3 hours.

TABLE 1-3

| | | Optical glass | | | | | |
|---|---|---|---|---|---|---|---|
| No. | | 10 | 11 | 12 | 13 | 14 | 15 |
| Cationic % | $P^{5+}$ | 11.17 | 11.17 | 11.17 | 11.67 | 11.17 | 11.17 |
| | $Al^{3+}$ | 27.09 | 28.09 | 28.09 | 31.59 | 32.08 | 32.09 |
| | $Mg^{2+}$ | 4.07 | 4.07 | 4.07 | 4.07 | 4.07 | 4.07 |
| | $Ca^{2+}$ | 23.26 | 23.26 | 23.26 | 23.26 | 25.00 | 23.26 |
| | $Sr^{2+}$ | 15.09 | 15.09 | 15.09 | 15.09 | 16.09 | 15.09 |
| | $Ba^{2+}$ | 8.52 | 8.52 | 8.52 | 8.52 | 5.79 | 8.52 |
| | $Li^+$ | 8.12 | 7.12 | 7.12 | 3.12 | 3.12 | 3.12 |
| | $Na^+$ | 0.00 | 0.00 | 0.00 | 0.00 | 0.00 | 0.00 |
| | $K^+$ | 0.00 | 0.00 | 0.00 | 0.00 | 0.00 | 0.00 |
| | $Y^{3+}$ | 2.68 | 2.68 | 2.68 | 2.68 | 2.68 | 2.68 |
| | $Zn^{2+}$ | 0.00 | 0.00 | 0.00 | 0.00 | 0.00 | 0.00 |
| Anionic % | $O^{2-}$ | 19.34 | 19.16 | 18.47 | 18.15 | 17.82 | 17.82 |
| | $Cl^-$ | 0.19 | 0.19 | 0.18 | 0.18 | 0.18 | 0.18 |
| | $F^-$ | 80.47 | 80.65 | 81.35 | 81.67 | 82.00 | 82.00 |
| $O^{2-}/P^{5+}$ | | 3.7 | 3.7 | 3.59 | 3.5 | 3.59 | 3.59 |
| $N_d$ | | 1.46545 | 1.46466 | 1.46196 | 1.45886 | 1.45599 | 1.45869 |
| $v_d$ | | 88.3 | 88.7 | 89.2 | 90 | 90.5 | 90.1 |
| Tg (° C.) | | 389 | 390 | 393 | 425 | 420 | 424 |
| LT (° C.) | | 650 | 650 | 650 | 620 | 610 | 620 |
| Nd(1 h) | | 1.46545 | 1.46466 | 1.46196 | 1.45886 | 1.45599 | 1.45869 |
| Nd(3 h) | | | 1.46570 | 1.46346 | 1.46067 | | 1.45989 |
| Nd(3 h) − Nd(1 h) | | | 0.00104 | 0.00150 | 0.00181 | | 0.00120 |
| |Nd(3 h) − Nd(1 h)| | | | 0.00104 | 0.00150 | 0.00181 | | 0.00120 |

(Notes)
Nd(1 h) shows a refractive index ($n_d$) of a sample obtained by melting at 900° C. for 1 hour.
Nd(3 h) shows a refractive index ($n_d$) of a sample obtained by melting at 900° C. for 3 hours.
$v_d$ (1 h) shows an Abbe's number ($v_d$) of a sample obtained by melting at 900° C. for 1 hour.
$v_d$ (3 h) shows an Abbe's number ($v_d$) of a sample obtained by melting at 900° C. for 3 hours.

TABLE 1-4

| | No. | Optical glass | | | | |
|---|---|---|---|---|---|---|
| | | 16 | 17 | 18 | 19 | 20 |
| Cationic % | $P^{5+}$ | 11.17 | 11.44 | 10.25 | 11.17 | 11.17 |
| | $Al^{3+}$ | 32.09 | 31.82 | 29.08 | 32.09 | 34.09 |
| | $Mg^{2+}$ | 4.07 | 4.20 | 4.07 | 4.07 | 4.07 |
| | $Ca^{2+}$ | 23.26 | 23.13 | 23.26 | 23.26 | 23.26 |
| | $Sr^{2+}$ | 15.09 | 15.09 | 15.09 | 15.09 | 15.09 |
| | $Ba^{2+}$ | 8.52 | 8.52 | 9.45 | 8.52 | 8.52 |
| | $Li^+$ | 3.12 | 3.12 | 6.12 | 3.12 | 3.12 |
| | $Na^+$ | 0.00 | 0.00 | 0.00 | 0.00 | 0.00 |
| | $K^+$ | 0.00 | 0.00 | 0.00 | 0.00 | 0.00 |
| | $Y^{3+}$ | 2.68 | 2.68 | 2.68 | 2.68 | 0.68 |
| | $Zn^{2+}$ | 0.00 | 0.00 | 0.00 | 0.00 | 0.00 |
| Anionic % | $O^{2-}$ | 17.82 | 17.76 | 17.36 | 17.32 | 17.32 |
| | $Cl^-$ | 0.18 | 0.18 | 0.18 | 0.18 | 0.18 |
| | $F^-$ | 82.00 | 82.06 | 82.46 | 82.50 | 82.50 |
| $O^{2-}/P^{5+}$ | | 3.59 | 3.5 | 3.7 | 3.5 | 3.5 |
| $N_d$ | | 1.45936 | 1.45832 | 1.46233 | 1.45729 | 1.45305 |
| $v_d$ | | 90.6 | 90.4 | 89.6 | 90.4 | 91.2 |
| Tg (° C.) | | 424 | 420 | 400 | 415 | 426 |
| LT (° C.) | | 620 | 610 | 650 | 620 | 650 |
| Nd(1 h) | | 1.45936 | 1.45832 | 1.46233 | 1.45729 | 1.45305 |
| Nd(3 h) | | 1.46048 | | | 1.45880 | |
| Nd(3 h) − Nd(1 h) | | 0.00112 | | | 0.00151 | |
| \|Nd(3 h) − Nd(1 h)\| | | 0.00112 | | | 0.00151 | |

(Notes)
Nd(1 h) shows a refractive index ($n_d$) of a sample obtained by melting at 900° C. for 1 hour.
Nd(3 h) shows a refractive index ($n_d$) of a sample obtained by melting at 900° C. for 3 hours.
$v_d$ (1 h) shows an Abbe's number ($v_d$) of a sample obtained by melting at 900° C. for 1 hour.
$v_d$ (3 h) shows an Abbe's number ($v_d$) of a sample obtained by melting at 900° C. for 3 hours.

TABLE 1-5

| | No. | Optical glass | | | | |
|---|---|---|---|---|---|---|
| | | 21 | 22 | 23 | 24 | 25 |
| Cationic % | $P^{5+}$ | 11.17 | 6.80 | 6.17 | 6.00 | 5.42 |
| | $Al^{3+}$ | 32.09 | 35.80 | 36.09 | 35.80 | 33.70 |
| | $Mg^{2+}$ | 4.07 | 4.30 | 3.07 | 4.30 | 6.83 |
| | $Ca^{2+}$ | 23.26 | 23.70 | 25.38 | 24.50 | 28.72 |
| | $Sr^{2+}$ | 15.09 | 18.40 | 15.09 | 18.40 | 17.16 |
| | $Ba^{2+}$ | 8.52 | 6.00 | 8.52 | 6.00 | 4.70 |
| | $Li^+$ | 3.12 | 2.30 | 2.00 | 2.30 | 1.00 |
| | $Na^+$ | 0.00 | 0.00 | 0.00 | 0.00 | 1.20 |
| | $K^+$ | 0.00 | 0.00 | 0.00 | 0.00 | 0.00 |
| | $Y^{3+}$ | 2.68 | 2.70 | 3.68 | 2.70 | 1.27 |
| | $Zn^{2+}$ | 0.00 | 0.00 | 0.00 | 0.00 | 0.00 |
| Anionic % | $O^{2-}$ | 17.32 | 10.22 | 9.21 | 9.01 | 8.43 |
| | $Cl^-$ | 0.18 | 0.17 | 0.17 | 0.17 | 0.00 |
| | $F^-$ | 82.50 | 89.61 | 90.62 | 90.82 | 91.57 |
| $O^{2-}/P^{5+}$ | | 3.5 | 3.5 | 3.5 | 3.5 | 3.57 |
| $N_d$ | | 1.45762 | 1.43915 | 1.43821 | 1.43696 | 1.43284 |
| $v_d$ | | 90.4 | 94.9 | 95.5 | 95.2 | 93.2 |
| Tg (° C.) | | 422 | | 410 | | 418 |
| LT (° C.) | | 600 | 650 | 650 | 670 | 650 |
| Nd(1 h) | | 1.45762 | 1.43915 | 1.43821 | 1.43696 | 1.43284 |
| Nd(3 h) | | | 1.44045 | | | 1.43455 |
| Nd(3 h) − Nd(1 h) | | | 0.00130 | | | 0.00171 |
| \|Nd(3 h) − Nd(1 h)\| | | | 0.00130 | | | 0.00171 |

(Notes)
Nd(1 h) shows a refractive index ($n_d$) of a sample obtained by melting at 900° C. for 1 hour.
Nd(3 h) shows a refractive index ($n_d$) of a sample obtained by melting at 900° C. for 3 hours.
$v_d$ (1 h) shows an Abbe's number ($v_d$) of a sample obtained by melting at 900° C. for 1 hour.
$v_d$ (3 h) shows an Abbe's number ($v_d$) of a sample obtained by melting at 900° C. for 3 hours.

TABLE 1-6

| No. | | Optical glass | | | | |
|---|---|---|---|---|---|---|
| | | 26 | 27 | 28 | 29 | 30 |
| Cationic % | $P^{5+}$ | 5.42 | 5.42 | 5.32 | 5.38 | 5.42 |
| | $Al^{3+}$ | 33.70 | 33.70 | 33.25 | 33.30 | 33.70 |
| | $Mg^{2+}$ | 6.83 | 6.83 | 7.70 | 6.63 | 5.83 |
| | $Ca^{2+}$ | 30.52 | 28.72 | 28.50 | 29.52 | 27.72 |
| | $Sr^{2+}$ | 17.16 | 17.16 | 17.16 | 17.00 | 17.16 |
| | $Ba^{2+}$ | 2.91 | 4.70 | 4.60 | 4.70 | 5.70 |
| | $Li^+$ | 1.00 | 1.00 | 1.00 | 1.00 | 1.00 |
| | $Na^+$ | 1.20 | 1.20 | 1.20 | 1.20 | 1.20 |
| | $K^+$ | 0.00 | 0.00 | 0.00 | 0.00 | 1.00 |
| | $Y^{3+}$ | 1.27 | 1.27 | 1.27 | 1.27 | 1.27 |
| | $Zn^{2+}$ | 0.00 | 0.00 | 0.00 | 0.00 | 1.00 |
| Anionic % | $O^{2-}$ | 8.24 | 8.24 | 8.17 | 8.17 | 8.28 |
| | $Cl^-$ | 0.17 | 0.17 | 0.17 | 0.17 | 0.00 |
| | $F^-$ | 91.59 | 91.59 | 91.66 | 91.66 | 91.72 |
| $O^{2-}/P^{5+}$ | | 3.5 | 3.5 | 3.5 | 3.5 | 3.5 |
| $N_d$ | | 1.43062 | 1.43295 | 1.43128 | 1.43256 | 1.43252 |
| $\nu_d$ | | 95.9 | 96 | 96.3 | 95.9 | 95.9 |
| Tg (° C.) | | | 415 | 421 | 418 | 417 |
| LT (° C.) | | 650 | 650 | 650 | 650 | 650 |
| Nd(1 h) | | 1.43062 | 1.43295 | 1.43128 | 1.43256 | 1.43252 |
| Nd(3 h) | | | 1.43415 | | | |
| Nd(3 h) − Nd(1 h) | | | 0.0012 | | | |
| |Nd(3 h) − Nd(1 h)| | | | 0.0012 | | | |

(Notes)
Nd(1 h) shows a refractive index ($n_d$) of a sample obtained by melting at 900° C. for 1 hour.
Nd(3 h) shows a refractive index ($n_d$) of a sample obtained by melting at 900° C. for 3 hours.
$\nu_d$ (1 h) shows an Abbe's number ($\nu_d$) of a sample obtained by melting at 900° C. for 1 hour.
$\nu_d$ (3 h) shows an Abbe's number ($\nu_d$) of a sample obtained by melting at 900° C. for 3 hours.

TABLE 1-7

| No. | | Optical glass | | | | |
|---|---|---|---|---|---|---|
| | | 31 | 32 | 33 | 34 | 35 |
| Cationic % | $P^{5+}$ | 5.42 | 5.42 | 5.42 | 5.17 | 5.17 |
| | $Al^{3+}$ | 33.70 | 33.70 | 33.70 | 35.09 | 35.09 |
| | $Mg^{2+}$ | 6.83 | 5.83 | 6.83 | 4.07 | 4.07 |
| | $Ca^{2+}$ | 28.72 | 27.72 | 28.72 | 27.26 | 25.38 |
| | $Sr^{2+}$ | 17.16 | 18.16 | 16.16 | 15.09 | 15.09 |
| | $Ba^{2+}$ | 4.70 | 5.70 | 4.70 | 4.52 | 9.52 |
| | $Li^+$ | 1.00 | 1.00 | 1.00 | 6.12 | 3.00 |
| | $Na^+$ | 1.20 | 1.20 | 1.20 | 0.00 | 0.00 |
| | $K^+$ | 0.00 | 0.00 | 0.00 | 0.00 | 0.00 |
| | $Y^{3+}$ | 1.27 | 1.27 | 1.27 | 2.68 | 2.68 |
| | $Zn^{2+}$ | 0.00 | 0.00 | 1.00 | 0.00 | 0.00 |
| Anionic % | $O^{2-}$ | 8.24 | 8.24 | 8.24 | 7.91 | 7.80 |
| | $Cl^-$ | 0.00 | 0.00 | 0.00 | 0.17 | 0.17 |
| | $F^-$ | 91.76 | 91.76 | 91.76 | 91.92 | 92.03 |
| $O^{2-}/P^{5+}$ | | 3.5 | 3.5 | 3.5 | 3.5 | 3.5 |
| $N_d$ | | 1.43229 | 1.4345 | 1.43224 | 1.43165 | 1.43795 |
| $\nu_d$ | | 96.9 | 95.9 | 96.1 | 95.7 | 95.4 |
| Tg (° C.) | | 418 | 419 | 415 | | 407 |
| LT (° C.) | | 650 | 650 | 650 | 650 | 650 |
| Nd(1 h) | | 1.43229 | 1.4345 | 1.43224 | 1.43165 | 1.43795 |
| Nd(3 h) | | | | | 1.43355 | |
| Nd(3 h) − Nd(1 h) | | | | | 0.00190 | |
| |Nd(3 h) − Nd(1 h)| | | | | | 0.00190 | |

(Notes)
Nd(1 h) shows a refractive index ($n_d$) of a sample obtained by melting at 900° C. for 1 hour.
Nd(3 h) shows a refractive index ($n_d$) of a sample obtained by melting at 900° C. for 3 hours.
$\nu_d$ (1 h) shows an Abbe's number ($\nu_d$) of a sample obtained by melting at 900° C. for 1 hour.
$\nu_d$ (3 h) shows an Abbe's number ($\nu_d$) of a sample obtained by melting at 900° C. for 3 hours.

TABLE 1-8

| | | Optical glass | | |
|---|---|---|---|---|
| No. | | 36 | 37 | 38 |
| Cationic % | $P^{5+}$ | 5.17 | 5.17 | 4.67 |
| | $Al^{3+}$ | 36.09 | 35.09 | 35.59 |
| | $Mg^{2+}$ | 4.07 | 4.07 | 4.07 |
| | $Ca^{2+}$ | 25.38 | 25.38 | 23.26 |
| | $Sr^{2+}$ | 15.09 | 15.09 | 15.09 |
| | $Ba^{2+}$ | 8.52 | 8.52 | 8.52 |
| | $Li^+$ | 3.00 | 3.00 | 6.12 |
| | $Na^+$ | 0.00 | 0.00 | 0.00 |
| | $K^+$ | 0.00 | 0.00 | 0.00 |
| | $Y^{3+}$ | 2.68 | 3.68 | 2.68 |
| | $Zn^{2+}$ | 0.00 | 0.00 | 0.00 |
| Anionic % | $O^{2-}$ | 7.77 | 7.77 | 7.12 |
| | $Cl^-$ | 0.17 | 0.17 | 0.17 |
| | $F^-$ | 92.06 | 92.06 | 92.71 |
| $O^{2-}/P^{5+}$ | | 3.5 | 3.5 | 3.5 |
| $N_d$ | | 1.43644 | 1.43811 | 1.43382 |
| $v_d$ | | 95.7 | 95.7 | 95.8 |
| Tg ( ) | | 410 | 409 | 390 |
| LT ( ) | | 650 | 650 | 670 |
| Nd (1 h) | | 1.43644 | 1.43811 | 1.43382 |
| Nd (3 h) | | | | 1.43493 |
| Nd (3 h) – Nd (1 h) | | | | 0.00111 |
| \|Nd (3 h) – Nd (1 h)\| | | | | 0.00111 |

(Notes)
Nd (1 h) shows a refractive index ($n_d$) of a sample obtained by melting at 900° C. for 1 hour.
Nd (3 h) shows a refractive index ($n_d$) of a sample obtained by melting at 900° C. for 3 hours.
$v_d$ (1 h) shows an Abbe's number ($v_d$) of a sample obtained by melting at 900° C. for 1 hour.
$v_d$ (3 h) shows an Abbe's number ($v_d$) of a sample obtained by melting at 900° C. for 3 hours.

In the optical glass of the present invention, there is only a small difference in Abbe's number ($v_d$) depending upon the time period for melting raw materials, and hence any one of $v_d$ (1 h) and $v_d$ (3 h) may be used as an Abbe's number ($v_d$). When a rigorous Abbe's number ($v_d$) is to be determined, $v_d$ (1 h) shall be used as the Abbe's number ($v_d$) of the optical glass of the present invention.

In addition, each of the above optical glasses Nos. 1 to 38 may contain 0.5 to 13 cationic %, based on the corresponding glass composition excluding $Cu^{2+}$, of $Cu^{2+}$ for use as a near infrared absorption glass.

Striae were not found in any one of the optical glasses Nos. 1 to 38 and optical glasses obtained by incorporating 0.5 to 13 cationic %, based on the corresponding glass composition excluding $Cu^{2+}$, of $Cu^{2+}$ to each of these optical glasses, and they were optically very homogeneous.

Example 2

Production Examples of Press-Molding Preforms

Preforms were produced from the optical glasses Nos. 1 to 38 shown in Tables 1-1 to 1-8 in the following manner. A molten glass was caused to flow at a constant flow rate out of a pipe made of a platinum alloy that was temperature-adjusted to a temperature range in which the molten glass could be caused to stably flow out without devitrification of the glass. And, molten glass gobs were separated by a method in which the glass gob was allowed to drop or a method in which the forward end of the molten glass was supported with a support and then the support was rapidly moved down to separate the glass gob. It should be understood that each of the thus-obtained molten glass gobs had the weight obtained by adding the weight of removal amount to the weight of one preform intended.

Then, the thus-obtained molten glass gobs were received with receiving molds with an ejection port in the bottom portion thereof each, and press-molding preforms were produced while the glass gobs were caused to float by ejecting a gas from the gas ejection ports. The preforms were imparted with the form of a sphere or a flattened sphere by adjusting and setting the intervals of separation from the molten glass. The weight each of the obtained preforms was accurately in agreement with set values, and all the preforms had smooth surfaces.

Further, as another method, the entire surface of each of shaped spherical preforms was polished by a known method to remove the entire surface layer, whereby optically homogeneous preforms were obtained.

Glass plates were obtained from the optical glasses Nos. 1 to 38 shown in Tables 1-1 to 1-8 in the following manner. A molten glass was caused to flow at a constant flow rate out of a pipe made of a platinum alloy that was temperature-adjusted to a temperature range in which the molten glass could be caused to stably flow out without devitrification of the glass. While the molten glass was continuously cast into a casting mold, a shaped glass plate was drawn through an opening portion on a side of the casting mold at a constant speed in the horizontal direction, and allowed to pass through the inside of an annealing furnace to remove a strain. Then, it was cut to a desired length to give glass plates one by one.

Then, each glass plate was cut into pieces in the form of dice to prepare a plurality of glass pieces, and these glass pieces were ground and polished to give optically homogeneous preforms having smooth surfaces.

Example 3

Production Example of Optical Elements

Each of the above-obtained preforms was precision press-molded with a press apparatus shown in FIG. 1 to give aspherical lenses.

That is, there was provided a press mold having an upper mold member 1, a lower mold member 2 and a sleeve 3, and a preform was placed between the lower mold member 2 and the upper mold member 1. Then, a nitrogen atmosphere was introduced into a quartz tube 11, and a heater 12 is electrically powered to heat the inside of the quartz tube 11. The temperature inside the press mold was set at a temperature at which the glass to be molded exhibited a viscosity of $10^8$ to $10^{10}$ dPa·s, and while this temperature was maintained, a press rod 13 was moved downward to press the upper mold member 1, and the preform set in the mold was thereby pressed. The pressure of the press was set at 8 MPa, and the pressing time period was set for 30 seconds. After the pressing, the pressure of the press was removed, and the glass molded product obtained by the press molding was gradually cooled to a temperature at which the above glass exhibited a viscosity of $10^{12}$ dPa·s or more in state where it was in contact with the lower mold member 2 and the upper mold member 1. Then, it was rapidly cooled to room temperature and then the glass molded product was taken out of the mold to give an aspherical lens. The spherical lenses obtained in the above manner had very high surface accuracy.

In FIG. 1, reference numeral 9 indicates a support rod, reference numeral 10 indicates a lower mold member/sleeve holder, and reference numeral 14 indicates a thermocouple.

Some of the aspherical lenses obtained by the precision press-molding were provided with an anti-reflection film each as required.

Preforms that were the same as the above preforms were precision press-molded by a method different from the above method. In this method, first, a preform was pre-heated up to a temperature at which the glass constituting the preform exhibited a viscosity of $10^8$ dPa·s while it was caused to float. On the other hand, a press mold having an upper mold member, a lower mold member and a sleeve was heated up to a temperature at which the glass constituting the above preform exhibited a viscosity of $10^9$ to $10^{12}$ dPa·s, and the above pre-heated preform was introduced into the cavity of the press mold and precision press-molded at 10 MPa. Upon the start of the pressing, the cooling of the glass and the press mold was started, and they were cooled to a temperature at which the molded glass came to have a viscosity of $10^{12}$ dPa·s or more. Then, the molded product was taken out of the mold to give an aspherical lens. Aspherical lenses obtained in the above manner had very high surface accuracy.

Some of the aspherical lenses obtained by the above precision press-molding were provided with an anti-reflection film each as required.

In the above manners, there were highly productively and highly accurately produced optical elements that had high inside quality each and that were made of glass.

Example 4

Production Example of Optical Element Blank

Optical element blanks were produced from the optical glasses Nos. 1 to 38 shown in Tables 1-1 to 1-8 in the following manner. A molten glass was caused to flow at a constant flow rate out of a pipe made of a platinum alloy that was temperature-adjusted to a temperature range in which the molten glass could be caused to stably flow out without devitrification of the glass, and the molten glass was fed on the molding surface of a lower mold member constituting a press mold. Incidentally, prior to the feeding of the molten glass, a mold release agent in the form of a powder such as a boron nitride powder is uniformly applied to the molding surface of the lower mold member.

Then, the molten glass that is flowing out is cut with a cutting blade called shears, to obtain a molten glass gob on the molding surface of the lower mold member.

Then, the lower mold member with the molten glass gob on it is introduced into a position where the upper mold member of the press mold is standing above, and the molten glass gob is pressed with the upper and lower mold members while the glass gob is in a softened state. The upper and lower mold members were separated from each other, and a press-molded product obtained in this manner was released taken out of the mold to give an optical element blank. Then, the thus-obtained blank was annealed to remove a strain and to adjust its optical properties such that the optical properties such as a refractive index, etc., came to be precisely equal to desired values, to give an optical element blank having a desired from. In this manner, there were produced lens blanks having forms similar to those of various spherical lenses such as a convex meniscus lens, a concave meniscus lens, a plano-convex lens, a plano-concave lens, a biconvex lens, a biconcave lens, and the like.

Separately, optical element blanks were produced from the optical glasses Nos. 1 to 38 shown in Tables 1-1 to 1-8 in the following manner. A molten glass was caused to flow at a constant flow rate out of a pipe made of a platinum alloy that was temperature-adjusted to a temperature range in which the molten glass could be caused to stably flow out without devitrification of the glass, and while the molten glass was continuously cast into a casting mold, a shaped glass plate was withdrawn at a constant speed in the horizontal direction through an opening portion on a side of the casting mold and allowed to pass through an inside of an annealing furnace to remove a strain. Then, it was cut to a desired length to give glass plates one by one.

Then, the glass plates were cut to produce a plurality of glass pieces in the form of dice, and these glass pieces were barrel-ground to remove edges of the glass pieces and to adjust their weights so that they had desired weights, whereby there were obtained preforms whose surfaces were roughened.

Boron nitride in the form of a powder was uniformly applied to the entire surface of each preform, the preforms were placed on refractory plates and the plates were placed in a heating furnace to heat and soften the preforms. A softened preform was introduced into a press mold and press-molded. Optical element blanks were obtained in this manner.

The thus-obtained optical element blanks were annealed to remove a strain and to adjust their optical properties such that the optical properties such as a refractive index, etc., came to be precisely equal to desired values, to give an optical element blank having a desired from. In this manner, there were produced lens blanks having forms similar to those of various spherical lenses such as a convex meniscus lens, a concave meniscus lens, a plano-convex lens, a plano-concave lens, a biconvex lens, a biconcave lens, and the like.

Example 5

Production Example of Optical Element

The optical element blanks obtained in Example 4 were ground and polished to give various spherical lenses such as a convex meniscus lens, a concave meniscus lens, a plano-convex lens, a plano-concave lens, a biconvex lens, a biconcave lens, and the like.

Further, the annealed glass plates obtained in Example 4 were cut and the cut pieces were ground and polished to give various spherical lenses such as a convex meniscus lens, a concave meniscus lens, a plano-convex lens, a plano-concave lens, a biconvex lens, a biconcave lens, and the like.

In the above manners, there were highly productively and highly accurately produced optical elements that had high inside quality each and that were made of glass.

Example 6

Production Example of Optical Element

Near infrared absorption glasses were obtained from the optical glasses Nos. 1 to 38 obtained in Example 1 by adding 0.5 to 13 cationic % of $Cu^{2+}$ based on the above optical glasses excluding $Cu^{2+}$, and they were sliced to obtain flat plates. Main surfaces of the flat plates were optically polished to produce near infrared absorption filters.

INDUSTRIAL UTILITY

According to the present invention, there can be obtained a low-dispersion optical glass, which is capable of suppressing the volatilization of a glass component and the variation of quality involved in the fluctuations of a glass composition when an optical glass formed of a fluorophosphate glass is produced or when the produced glass in a molten state is caused to flow out of a pipe and shaped into a glass shaped material, and there can be produced press-molding preforms from the above optical glass and, further, optical elements such as various lenses, and the like.

The invention claimed is:

1. An optical glass that has an Abbe's number (vd) of over 70 and that is formed of a fluorophosphate glass having an $Li^+$ content of 0.5 to 30 cationic % and an $O^{2-}$ content/$P^{5+}$ content molar ratio, $O^{2-}/P^{5+}$, of 3.50 or more.

2. The optical glass of claim 1, which is formed of a fluorophosphate glass having a refractive index (nd) of over 1.53, having a total rare earth element of less than 5 cationic % and a $B^{3+}$ content of 0 to 5 cationic %, and having an $F^-$ content/$F^-$ and $O^{2-}$ total content molar ratio, $F^-/(F^-+O^{2-})$, of 0.3 or more.

3. The optical glass of claim 2, which contains no ion having absorption in the visible light region.

4. The optical glass of claim 2, wherein the fluorophosphate glass comprises, by cationic %,
20 to 50% of $P^{5+}$,
5 to 40% of $Al^{3+}$,
0 to 10% of $Mg^{2+}$,
0 to 20% of $Ca^{2+}$,
0 to 20% of $Sr^{2+}$,
0 to 40% of $Ba^{2+}$,
provided that the total content of $Mg^{2+}$, $Ca^{2+}$, $Sr^{2+}$ and $Ba^{2+}$ is 10% or more,
0.5 to 30% of $Li^+$,
0 to 20% of $Na^+$,
0 to 20% of $K^+$,
0 to 5% of $Y^{3+}$, exclusive of 5%,
0 to 5% of $La^{3+}$, exclusive of 5%,
0 to 5% of $Gd^{3+}$, exclusive of 5%,
0 to 5% of $Yb^{3+}$, exclusive of 5%,
provided that the total content of $Y^{3+}$, $La^{3+}$, $Gd^{3+}$ and $Yb^{3+}$ is less than 5%,
0 to 5% of $B^{3+}$,
0 to 20% of $Zn^{2+}$ and
0 to 20% of $In^{3+}$.

5. The optical glass of claim 2, wherein the fluorophosphate glass comprises, by cationic %,
20 to 50% of $P^{5+}$,
5 to 40% of $Al^{3+}$,
0 to 10% of $Mg^{2+}$,
0 to 20% of $Ca^{2+}$,
0 to 20% of $Sr^{2+}$,
0 to 40% of $Ba^{2+}$,
provided that the total content of $Mg^{2+}$, $Ca^{2+}$, $Sr^{2+}$ and $Ba^{2+}$ is 10% or more,
0.5 to 30% of $Li^+$,
0 to 20% of $Na^+$,
0 to 20% of $K^+$,
0 to 5% of $Y^{3+}$, exclusive of 5%,
0 to 5% of $La^{3+}$, exclusive of 5%,
0 to 5% of $Gd^{3+}$, exclusive of 5%,
0 to 5% of $Yb^{3+}$, exclusive of 5%,
provided that the total content of $Y^{3+}$, $La^{3+}$, $Gd^{3+}$ and $Yb^{3+}$ is less than 5%,
0 to 5% of $B^{3+}$,
0 to 20% of $Zn^{2+}$ and
0 to 20% of $In^{3+}$.

6. The optical glass of claim 4, which contains no ion having absorption in the visible light region.

7. A process for the production of an optical glass formed of a fluorophosphate glass, which comprises using, as raw materials or cullet, a glass composition having a total $O^{2-}$ content/total $P^{5+}$ content molar ratio, $O^{2-}/P^{5+}$, of 3.50 or more when an optical glass is produced by melting the raw materials or cullet and refining and homogenizing a molten glass, and thereby producing the optical glass recited in claim 1.

8. A process for the production of an optical glass formed of a fluorophosphate glass, which comprises preparing a raw material batch from raw materials or cullet, melting the raw material batch and then carrying out refining and homogenization,
the process comprising preparing the raw material batch in which the $Li^+$ content is 0.5 to 30 cationic % and the total $O^{2-}$ content/total $P^{5+}$ content molar ratio, $O^{2-}/P^{5+}$, is 3.5 or more and carrying out the melting, refining and homogenization to produce a fluorophosphate glass having an Abbe's number ($v_d$) of over 70.

9. A process for the production of an optical glass formed of a fluorophosphate glass, which comprises preparing a raw material batch from raw materials or cullet, melting the raw material batch, then carrying out refining and homogenization to prepare a molten glass having an $Li^+$ content of 0.5 to 30 cationic %, an $O^{2-}$ content/$P^{5+}$ content molar ratio of, $O^{2-}/P^{5+}$, of 3.5 or more, and an Abbe's number (vd) of over 70, and shaping said molten glass,
the process comprising controlling the total $O^{2-}$ content/total $P^{5+}$ content molar ratio, $O^{2-}/P^{5+}$, in said raw material batch for decreasing the volatility of said molten glass.

10. The process for the production of an optical glass as recited in claim 8, wherein the fluorophosphate glass having a rare earth element total content of less than 5 cationic %, an $F^-$ content/$F^-$ and $O^{2-}$ total content molar ratio, $F^-/(F^-+O^{2-})$, of 0.3 or more and a refractive index ($n_d$) of over 1.53 is produced.

11. The process for the production of an optical glass as recited in claim 10, wherein the fluorophosphate glass containing no ion having absorption in the visible light region is produced.

12. An optical element formed of the optical glass recited in claim 1.

13. A process for the production of an optical glass formed of a fluorophosphate glass, which comprises preparing a raw material batch from raw materials or cullet, melting the raw material batch and then carrying out refining and homogenization,
the process comprising preparing the raw material batch in which $Li^+$ content is 0.5 to 30 cationic % and the total $O^{2-}$ content/total $P^{5+}$ content molar ratio, $O^{2-}/P^{5+}$, is 3.5 or more and carrying out the melting, refining and homogenization to produce a fluorophosphate glass having no ion having absorption in the visible light region, a rare earth element total content of less than 5 cationic %, an $F^-$ content/$F^-$ and $O^{2-}$ total content molar ratio, $F^-/(F^-+O^{2-})$, of 0.3 or more, an Abbe's number ($v_d$) of over 70 and a refractive index ($n_d$) of over 1.53.

* * * * *